(12) United States Patent
Wade et al.

(10) Patent No.: US 11,893,693 B2
(45) Date of Patent: Feb. 6, 2024

(54) SYSTEMS AND METHODS FOR GENERATING DIGITAL MEDIA BASED ON OBJECT FEATURE POINTS

(71) Applicant: SHOPIFY INC., Ottawa (CA)

(72) Inventors: Jonathan Wade, Ottawa (CA); Juho Mikko Haapoja, Toronto (CA); Stephan Leroux, East Gwillimbury (CA); Daniel Beauchamp, Toronto (CA)

(73) Assignee: SHOPIFY INC.

( * ) Notice: Subject to any disclaimer, the term of this patent is extended or adjusted under 35 U.S.C. 154(b) by 0 days.

(21) Appl. No.: 17/346,448

(22) Filed: Jun. 14, 2021

(65) Prior Publication Data

US 2022/0398809 A1  Dec. 15, 2022

(51) Int. Cl.
| | |
|---|---|
| *G06T 19/00* | (2011.01) |
| *G06T 17/00* | (2006.01) |
| *G06T 13/20* | (2011.01) |
| *G06Q 30/0601* | (2023.01) |
| *G06F 16/44* | (2019.01) |
| *G06N 20/00* | (2019.01) |
| *G06F 3/04842* | (2022.01) |
| *G11B 27/10* | (2006.01) |

(52) U.S. Cl.
CPC .............. *G06T 19/00* (2013.01); *G06F 16/44* (2019.01); *G06N 20/00* (2019.01); *G06Q 30/0643* (2013.01); *G06T 13/20* (2013.01); *G06T 17/00* (2013.01); *G06F 3/04842* (2013.01); *G06Q 30/0633* (2013.01); *G06T 2200/24* (2013.01); *G06T 2219/004* (2013.01); *G11B 27/10* (2013.01)

(58) Field of Classification Search
None
See application file for complete search history.

(56) References Cited

U.S. PATENT DOCUMENTS

| | | | | |
|---|---|---|---|---|
| 10,223,107 | B2* | 3/2019 | Liimatainen | H04W 4/60 |
| 10,524,018 | B2* | 12/2019 | Kim | H04N 21/431 |
| 10,674,205 | B2* | 6/2020 | Gupta | H04N 21/458 |
| 11,200,072 | B2* | 12/2021 | Klein | G06F 9/44505 |
| 2017/0132841 | A1 | 5/2017 | Morrison | |
| 2018/0322623 | A1* | 11/2018 | Memo | G06T 7/0004 |
| 2019/0340649 | A1 | 11/2019 | Ayush et al. | |
| 2020/0034369 | A1* | 1/2020 | Gourley | G06F 16/9535 |
| 2021/0064217 | A1* | 3/2021 | Mildrew | G06F 3/0482 |

* cited by examiner

*Primary Examiner* — Saptarshi Mazumder

(57) ABSTRACT

Generating and storing digital media can be resource intensive processes. Some systems and methods disclosed herein relate to generating digital media using a pre-existing three-dimensional (3D) model of an object and feature points of the object. According to an embodiment, a method includes an e-commerce platform receiving a request for digital media depicting an object. In response to the request, the e-commerce platform may obtain a 3D model corresponding to the object and data pertaining to one or more feature points of the object. The one or more feature points may correspond to respective views of the 3D model. The e-commerce platform may then generate the digital media based on the 3D model and the one or more feature points, where the digital media could include renders of the 3D model depicting the one or more feature points.

26 Claims, 13 Drawing Sheets

| E-Commerce Platform | Search | JG John's Apparel / Jonny B. Good |
|---|---|---|

- Home
- Orders
- Products
- Customers
- Reports
- Discounts
- Apps

SALES CHANNELS ⊕
- Online Store
- Mobile App

View all channels

⚙ Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

All channels ∨   Today ∨

TOTAL SALES
$98.00

$125
$75
$25

12am    8pm    4pm    11pm
                       Jun 1
                       2 orders

TOTAL SALES BY CHANNEL   View dashboard

Online Store                 Jun 1
$0.00                        0 orders

Mobile app
$0.00                        0 orders

Shopify POS (126 York St)
$0.00                        0 orders

FIG. 2

SYSTEMS AND METHODS FOR GENERATING DIGITAL MEDIA BASED ON OBJECT FEATURE POINTS

FIELD

The present application relates to digital media and, in particular embodiments, to systems and methods for generating digital media.

BACKGROUND

E-commerce has become an increasingly popular means for merchants to drive sales of their products. These products may be presented to customers via product media. Product media may include any form of digital media, including images, videos and/or three-dimensional (3D) models, for example, that depict a product. In some cases, product media may be implemented in an online store and/or in another form of digital merchandising to allow a customer to view a product. However, obtaining product media may be resource intensive for a merchant. For example, product media may be expensive and/or time-consuming to generate. Creating high-quality product images and videos may involve the use of a professional photographer, videographer, graphic designer, and/or photography studio.

SUMMARY

Some embodiments of the present disclosure provide systems and methods for generating digital media using pre-existing 3D models. For example, digital media may be automatically generated by rendering a pre-existing 3D model corresponding to an object. The renders may be generated to depict specific feature points of the object, which could correspond to important or significant aspects of the object. For example, the feature points may be determined based on previous user interactions with the 3D model and/or based on previous user interactions with other digital content related to the object. The feature points may be determined and stored automatically, enabling the digital media to be generated automatically. In this way, the digital media may be relatively inexpensive and efficient to produce.

In the field of e-commerce, product media may be generated based on a pre-existing 3D product model. The product media may include renders of the 3D product model that depict various features points of the product. These feature points may be determined based on customer behaviour data and/or may be selected by a merchant. Further, digital content corresponding to the feature points may be incorporated into the product media to provide further context for the feature points. The digital content may include text and/or audio content that describes the feature points, for example. The generated product media may be implemented in an online store and/or another form of digital mechanising to present the product to customers. The product media may have a smaller file size than the full 3D product model and therefore may be computationally more efficient to store and/or transmit to a customer device, as compared to the 3D product model.

According to an aspect of the present disclosure, there is provided a computer-implemented method including receiving a request for digital media depicting an object. The method may further include obtaining a 3D model corresponding to the object and obtaining data pertaining to one or more feature points of the object, the one or more feature points corresponding to respective views of the 3D model. The method may further include generating the digital media based on the 3D model and the one or more feature points, the digital media including renders of the 3D model depicting the one or more feature points.

In some embodiments, the one or more feature points of the object include a particular feature point of the object, and the renders of the 3D model include a particular render of the 3D model depicting the particular feature point. Further, the data pertaining to the one or more feature points may include digital content corresponding to the particular feature point. Optionally, the request for the digital media is associated with a software instance on a computing system and obtaining the data pertaining to the one or more feature points includes receiving the digital content from a user device associated with the software instance. Generating the digital media may include combining the digital content with the particular render of the 3D model. Optionally, the digital content includes text pertaining to the particular feature point. Combining the digital content with the particular render of the 3D model might then include associating the text pertaining to the particular feature point with a portion of the particular render corresponding to the particular feature point. Alternatively or additionally, the digital content includes audio content pertaining to the particular feature point. Combining the digital content with the particular render of the 3D model might include synchronizing at least a portion of the audio content with the particular render in the digital media.

In some embodiments, generating the digital media includes generating a video of the object, the video including transitions between the renders of the 3D model depicting the one or more feature points. The transitions may be based on further renders of the 3D model.

Notably, it may be that the feature points are automatically determined such as, for example, by deriving them from previous user interactions with the 3D model. In some embodiments, obtaining the data pertaining to the one or more feature points includes generating the data pertaining to one or more feature points based on stored data pertaining to user interactions with the 3D model. The stored data pertaining to the user interactions with the 3D model may indicate user views of a particular feature point of the object. Further, generating the data pertaining to the one or more feature points may include adding the particular feature point to the one or more feature points based on the user views.

In some embodiments, the request for the digital media is associated with a software instance on a computing system. Obtaining the data pertaining to the one or more feature points may include receiving, from a user device associated with the software instance, web content indicating user selection of at least one of the one or more feature points.

In some embodiments, the method further includes transmitting web content including the digital media to a user device for display on the user device. Optionally, obtaining the data pertaining to the one or more feature points includes generating the data pertaining to the one or more feature points based on stored data pertaining to user interactions with digital content different from the digital media, the user interactions corresponding to a particular user. The user device that the web content is transmitted to may be associated with the particular user.

According to another aspect of the present disclosure, there is a system including memory and at least one processor. The memory is to store a 3D model corresponding to an object and data pertaining to one or more feature points of the object. The one or more feature points may correspond to respective views of the 3D model. The at least one processor may be to receive a request for digital media depicting the object and generate the digital media based on the 3D model and the one or more feature points. The digital media may include renders of the 3D model depicting the one or more feature points.

In some embodiments, the one or more feature points of the object include a particular feature point of the object, and the renders of the 3D model include a particular render of the 3D model depicting the particular feature point. Further, the data pertaining to the one or more feature points may include digital content corresponding to the particular feature point and the at least one processor may be to combine the digital content with the particular render of the 3D model in the digital media. The digital content may include text pertaining to the particular feature point, and the at least one processor may be to associate the text pertaining to the particular feature point with a portion of the particular render corresponding to the particular feature point. Alternatively or additionally, the digital content may include audio content pertaining to the particular feature point, and the at least one processor may be to synchronize at least a portion of the audio content with the particular render in the digital media. Optionally, the request for the digital media is associated with a software instance on a computing system, and the at least one processor is to receive the digital content from a user device associated with the software instance.

In some embodiments, the digital media includes a video of the object, the video including transitions between the renders of the 3D model depicting the one or more feature points, where the transitions are based on further renders of the 3D model.

In some embodiments, the memory is to store data pertaining to user interactions with the 3D model, and the at least one processor is to generate the data pertaining to one or more feature points based on the stored data pertaining to the user interactions with the 3D model. Optionally, the stored data pertaining to the user interactions with the 3D model indicates user views of a particular feature point of the object, and the at least one processor is to add the particular feature point to the one or more feature points based on the user views.

In some embodiments, the request for the digital media is associated with a software instance on a computing system. The at least one processor may be to receive, from a user device associated with the software instance, web content indicating user selection of at least one of the one or more feature points.

In some embodiments, the at least one processor is to transmit web content including the digital media to a user device for display on the user device. Optionally, the at least one processor is to generate the data pertaining to the one or more feature points based on stored data pertaining to user interactions with digital content different from the digital media. The user interactions may correspond to a particular user, and the user device may be associated with the particular user.

According to yet another aspect of the present disclosure, there is provided a non-transitory computer readable medium storing computer executable instructions. When executed by a computer, these instructions cause the computer to receive a request for digital media depicting an object, obtain a 3D model corresponding to the object, obtain data pertaining to one or more feature points of the object, and generate the digital media based on the 3D model and the one or more feature points. The one or more feature points may correspond to respective views of the 3D model. Further, the digital media may include renders of the 3D model depicting the one or more feature points.

BRIEF DESCRIPTION OF THE DRAWINGS

Embodiments will be described, by way of example only, with reference to the accompanying figures wherein:

FIG. 2 is an example of a home page of an administrator, according to an embodiment;

DETAILED DESCRIPTION

For illustrative purposes, specific example embodiments will now be explained in greater detail below in conjunction with the figures.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
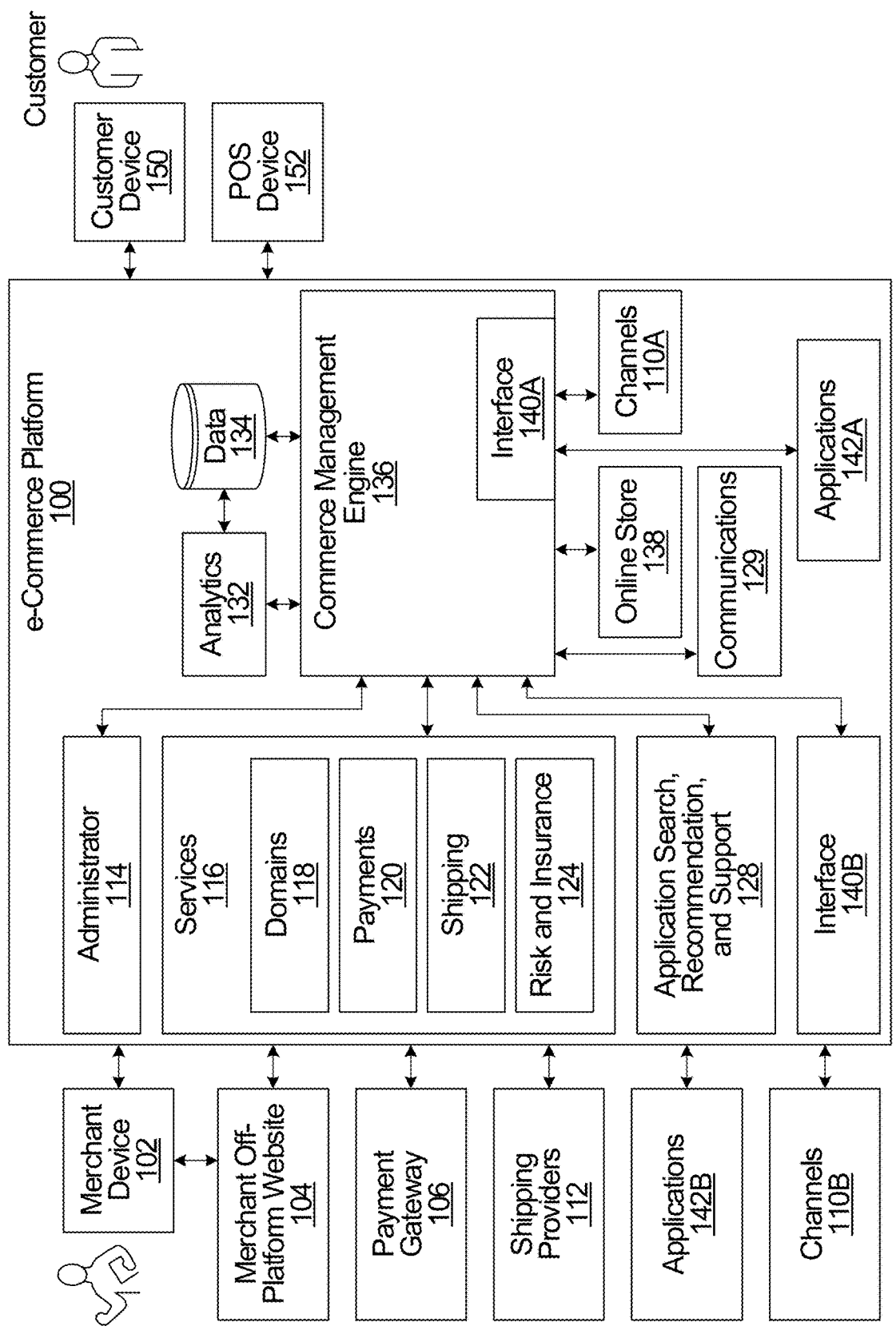
FIG. 1 is a block diagram of an e-commerce platform, according to an embodiment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Product Media

Merchants often present products to customers via product media, which may also be referred to as "product assets". Product media may include any form of digital media, such as images, videos and/or three-dimensional (3D) models, for example, that depict a product. By way of example, a merchant may use one or more product images to illustrate a product in an online store, an online marketplace, and/or digital advertising. The product images may highlight multiple different features of the product in order to provide the customers with a relatively complete demonstration of the product. A product video may also or instead be used to highlight multiple different features of a product. An example of a product video is a video "flyby", which shows multiple different views of a product with smooth transitions between those views. A video flyby may include zooming in on, and out from, various portions of a product. Product videos and/or images may help increase customer appeal and sale conversions for products (e.g., increase the number of products sold).

In some cases, text and/or audio content may be incorporated into product media to supplement visual depictions of a product. For example, a video may depict a certain feature of a product while corresponding text and/or audio content describes that feature. The text and/or audio content may be provided by a merchant. Alternatively or additionally, the text and/or audio content may be based on content provided by customers, such as product reviews, for example.

While product media is useful in e-commerce, it may also be relatively expensive and/or time-consuming to generate. A high-level of technical knowledge is often required to generate a high-quality product image or video. For example, creating high-quality product images and/or videos may involve the use of a professional photographer, a professional videographer, a graphic designer and/or photography studio time. It may be expensive and even impractical for a merchant to generate product images and/or videos for each product sold via their online store. Further, conventional methods of generating product media typically do not allow for personalized product media to be generated based on the interests of different customers. Accordingly, a need exists for systems and methods to help improve the generation of product media and other forms of digital media.

Figure 3:
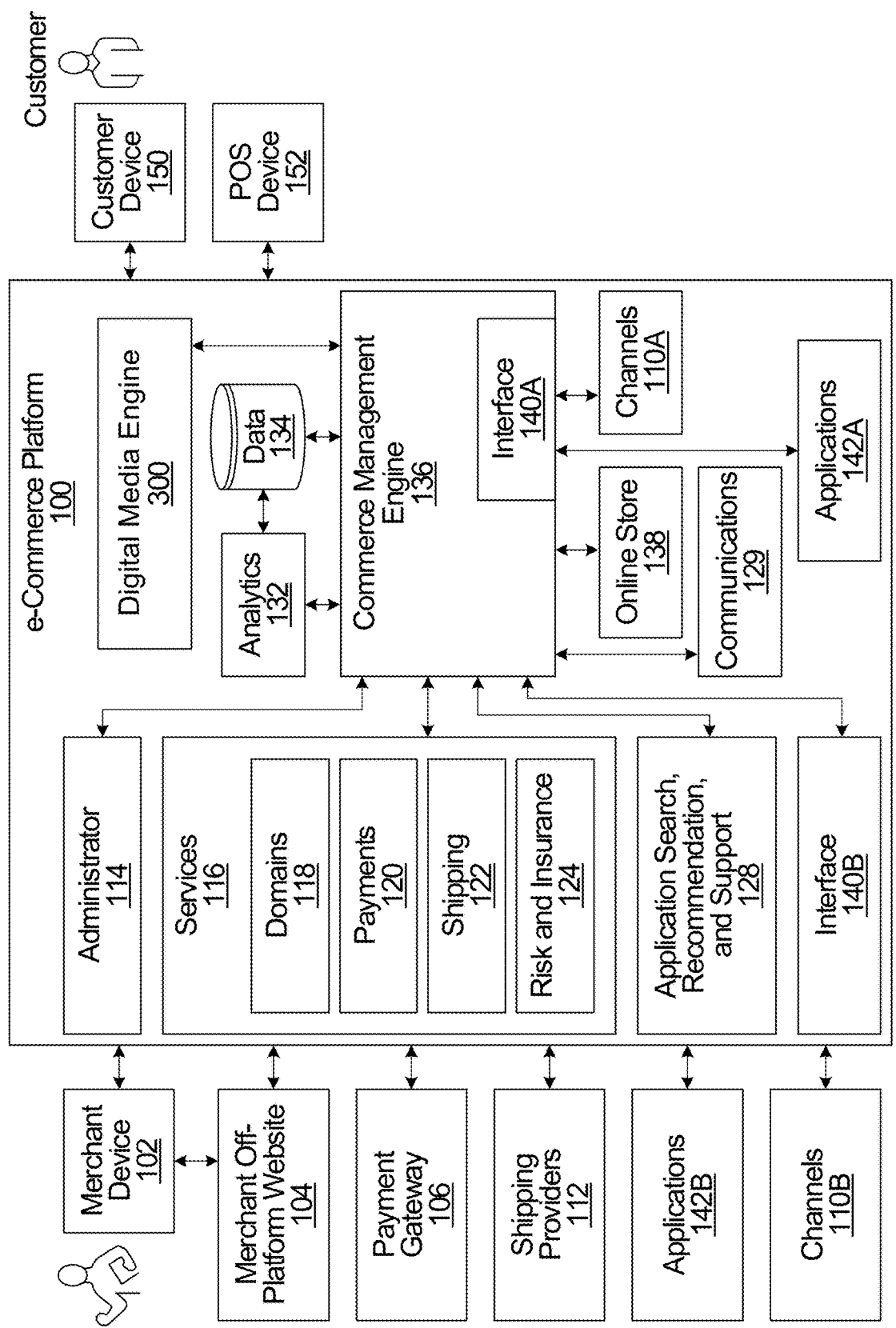
FIG. 3 illustrates the e-commerce platform of FIG. 1, but including a digital media engine.

FIG. 3 illustrates the e-commerce platform 100 of FIG. 1, but including a digital media engine 300. The digital media engine 300 is an example of a computer-implemented system for generating digital media. For example, the digital media engine 300 may generate product media for display on pages of the online store 138. Product media may be generated automatically by the digital media engine 300 using pre-existing 3D product models. For example, renders of a 3D product model may be used in a series of product images and/or a product video (e.g., a flyby video). Using a 3D model to generate images and/or videos may help avoid the use of professional photographers, videographers, graphic designers, and/or photography studio space. In this way, product images and/or videos that are generated based on pre-existing 3D models may be relatively inexpensive and efficient to produce. Moreover, personalized product media may be generated for customers in real-time using pre-existing 3D models.

The digital media engine 300 may help conserve computational resources at the e-commerce platform 100. For example, automatically producing digital media using the digital media engine 300 may mean that less product media needs to be stored at the e-commerce platform 100 at any given time, which may help conserve computer storage resources. When product media is needed for display on a product page of the online store 138, for example, it may be actively generated by the digital media engine 300 rather than being obtained from memory. Further, product images and/or videos generated based on pre-existing 3D models may have a smaller file size than the pre-existing 3D models. This smaller file size could reduce the computational requirements associated with storing and transmitting the images and/or videos, as compared to storing and transmitting the pre-existing 3D models.

Although the digital media engine 300 is illustrated as a distinct component of the e-commerce platform 100 in FIG. 3, this is only an example. A digital media engine could also or instead be provided by another component residing within or external to the e-commerce platform 100. In some embodiments, either or both of the applications 142A-B provide a digital media engine that implements the functionality described herein to make it available to customers and/or to merchants. Furthermore, in some embodiments, the commerce management engine 136 provides that digital media engine. However, the location of the digital media engine 300 is implementation specific. In some implementations, the digital media engine 300 is provided at least in part by an e-commerce platform, either as a core function of the e-commerce platform or as an application or service supported by or communicating with the e-commerce platform. Alternatively, the digital media engine 300 may be implemented as a stand-alone service to clients, such as a customer device 150 or a merchant device 102. In addition, at least a portion of such a digital media engine could be implemented in the merchant device 102 and/or in the customer device 150. For example, the customer device 150 could store and run a digital media engine locally as a software application.

As discussed in further detail below, the digital media engine 300 could implement at least some of the functionality described herein. Although the embodiments described below may be implemented in association with an e-commerce platform, such as (but not limited to) the e-commerce platform 100, the embodiments described below are not limited to e-commerce platforms.

Generating Digital Media Based on Object Feature Points

In some embodiments, the generation of digital media using a 3D model of an object is guided by known feature points of the object. These feature points may correspond to important, interesting, or otherwise significant aspects of the object. The digital media might include renders of the 3D model that depict each of the feature points. For example, the feature points may be mapped to corresponding views of the 3D model, and the 3D model may be rendered based on those views. In this way, the digital media may be automatically generated to depict the interesting aspects of the object.

Figure 4:
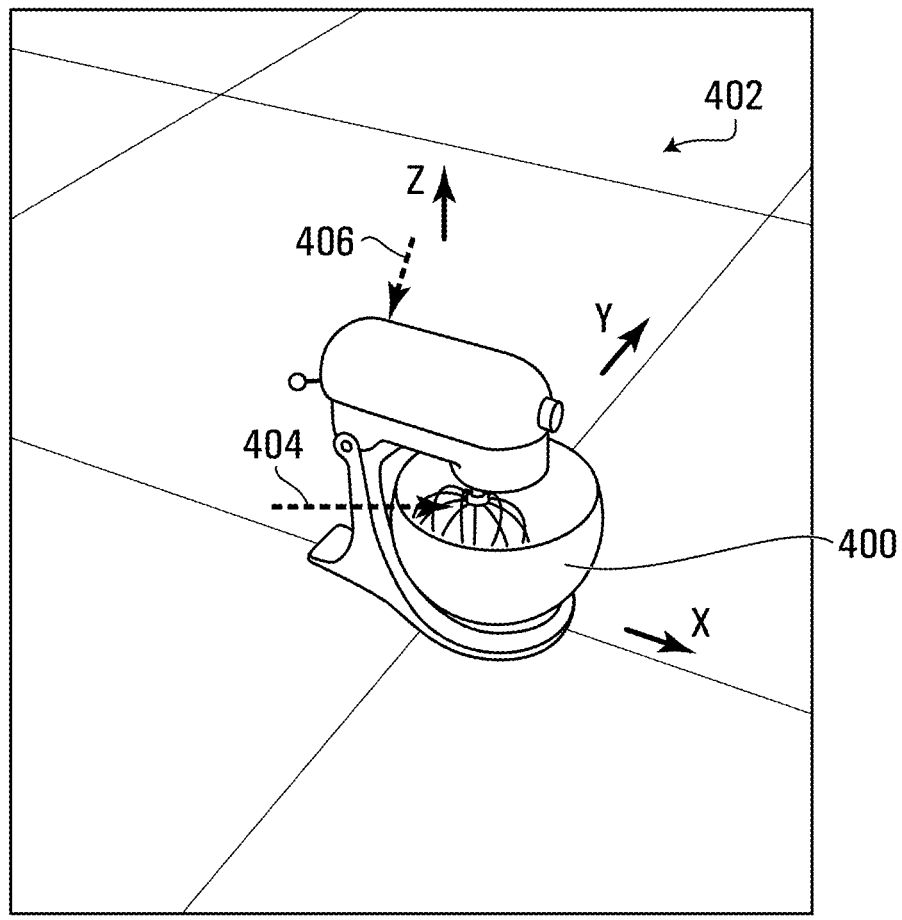
FIG. 4 is a perspective view of a 3D model placed at the origin of a virtual coordinate system, according to an embodiment.

FIG. 4 is a perspective view of a 3D model 400 placed at the origin of a virtual coordinate system 402, according to an embodiment. The 3D model 400 corresponds to a stand-up kitchen mixer. The 3D model 400 provides a mathematical representation of the mixer that is defined with a length, width, and height. In some implementations, the 3D model 400 may include a mesh (e.g., a polygonal mesh) defining the shape of the mixer, a texture map defining the surface appearance of the mixer, and/or virtual lighting representing real-world and/or computer-generated lighting conditions for the mixer. Other implementations of the 3D model 400 are also contemplated, including solid models and point clouds, for example. In addition to providing a visual representation of the mixer, the 3D model 400 may also have associated audio content and/or haptic content.

Two feature points 404, 406 of the mixer are indicated in FIG. 4 using dashed arrows pointing towards respective locations or regions on the 3D model 400. The feature points 404, 406 may correspond to significant commercial or design aspects of the mixer. In the illustrated example, the feature point 404 corresponds to a wire beater on the mixer, and the feature point 406 corresponds to a hinge on the mixer (this portion of the hinge is not visible in FIG. 4). Each of the feature points 404, 406 on the mixer may be mapped to a position and/or a direction within the virtual coordinate system 402. In some implementations, the feature points 404, 406 are mapped to locations on the virtual surfaces of the 3D model 400 (e.g., on a mesh of the 3D model 400). For example, the feature point 404 may be mapped to coordinates within the virtual coordinate system 402 that correspond to the wire beater on the 3D model 400, and the feature point 406 may be mapped to coordinates within the virtual coordinate system 402 that map to the hinge on the 3D model 400. Alternatively or additionally, the feature points 404, 406 may be mapped to different views of the 3D model 400. For example, the feature points 404, 406 may be mapped to vectors defined within the virtual coordinate system 402. The vector for the feature point 404 may indicate a preferred viewpoint or perspective relative to the 3D model 400 for depicting the wire beater, and the vector for the feature point 406 may indicate a preferred viewpoint or perspective relative to the 3D model 400 for depicting the hinge. The dashed arrows in FIG. 4 provide an example of such vectors for the feature points 404, 406.

Figure 5:
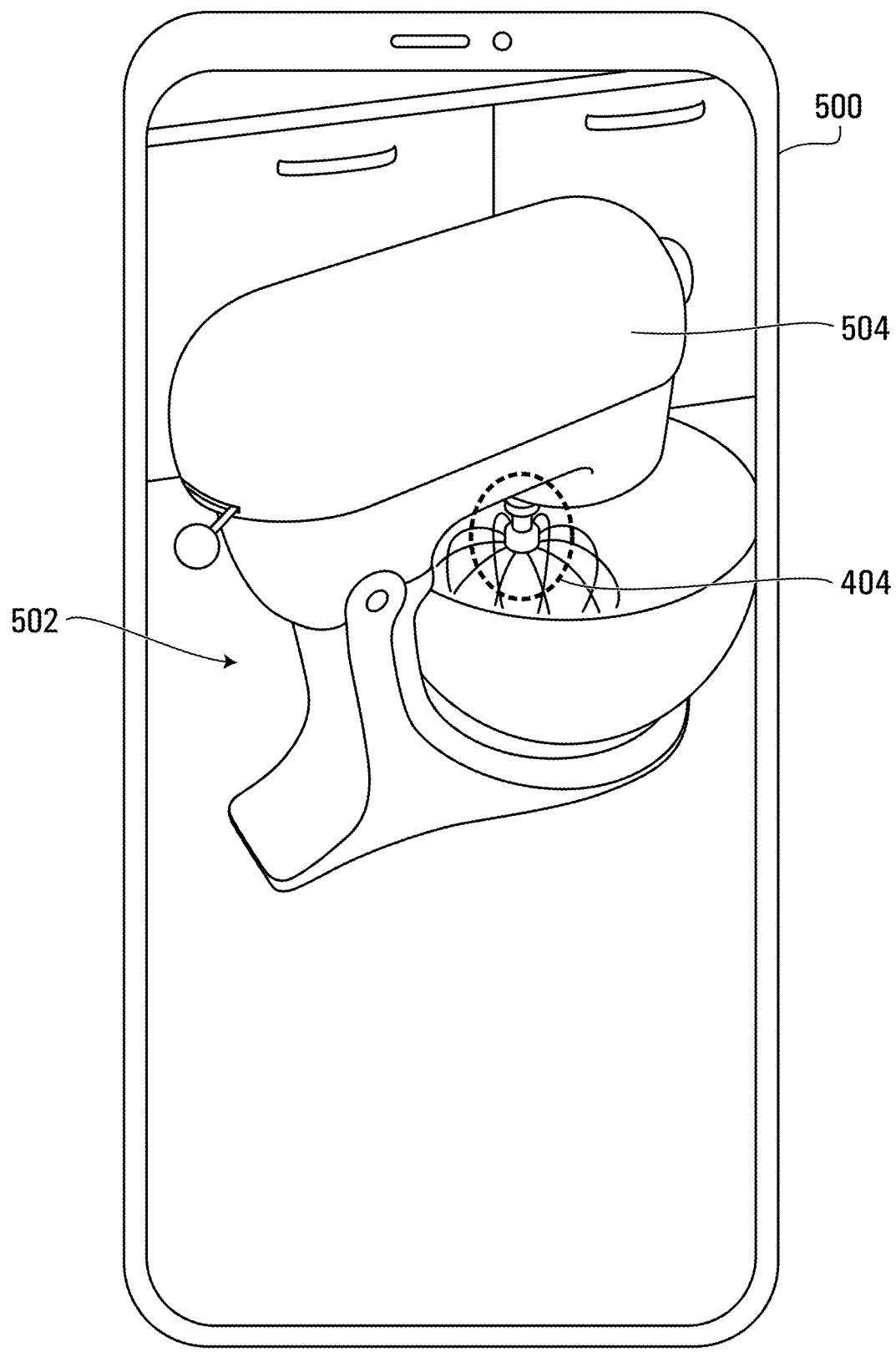
FIGS. 5 and 6 illustrate a user device displaying respective images generated based on the 3D model of FIG. 4.

The 3D model 400 and the feature points 404, 406 may be used to generate digital media depicting the mixer. FIG. 5 illustrates a user device 500 displaying an image 502 of the mixer. The image 502 includes a render 504 of the 3D model 400 that is generated based on the feature point 404 (the feature point 404 is indicated using a dashed circle in FIG. 5), such that feature point 404 is the focus of the render 504. For example, in the case that the feature point 404 is mapped to a coordinate within the virtual coordinate system 402, the render 504 may have been generated such that this coordinate is substantially positioned in the center of the render 504. Optionally, the coordinate for the feature point 404 may correspond to a location on a virtual surface of the 3D model 400, and a viewpoint for the render 504 may be oriented along a normal vector extending from this virtual surface. Alternatively or additionally, the feature point 404 may be mapped to a vector defined within the virtual coordinate system 402, and a viewpoint for the render 504 may be oriented along this vector.

Figure 6:
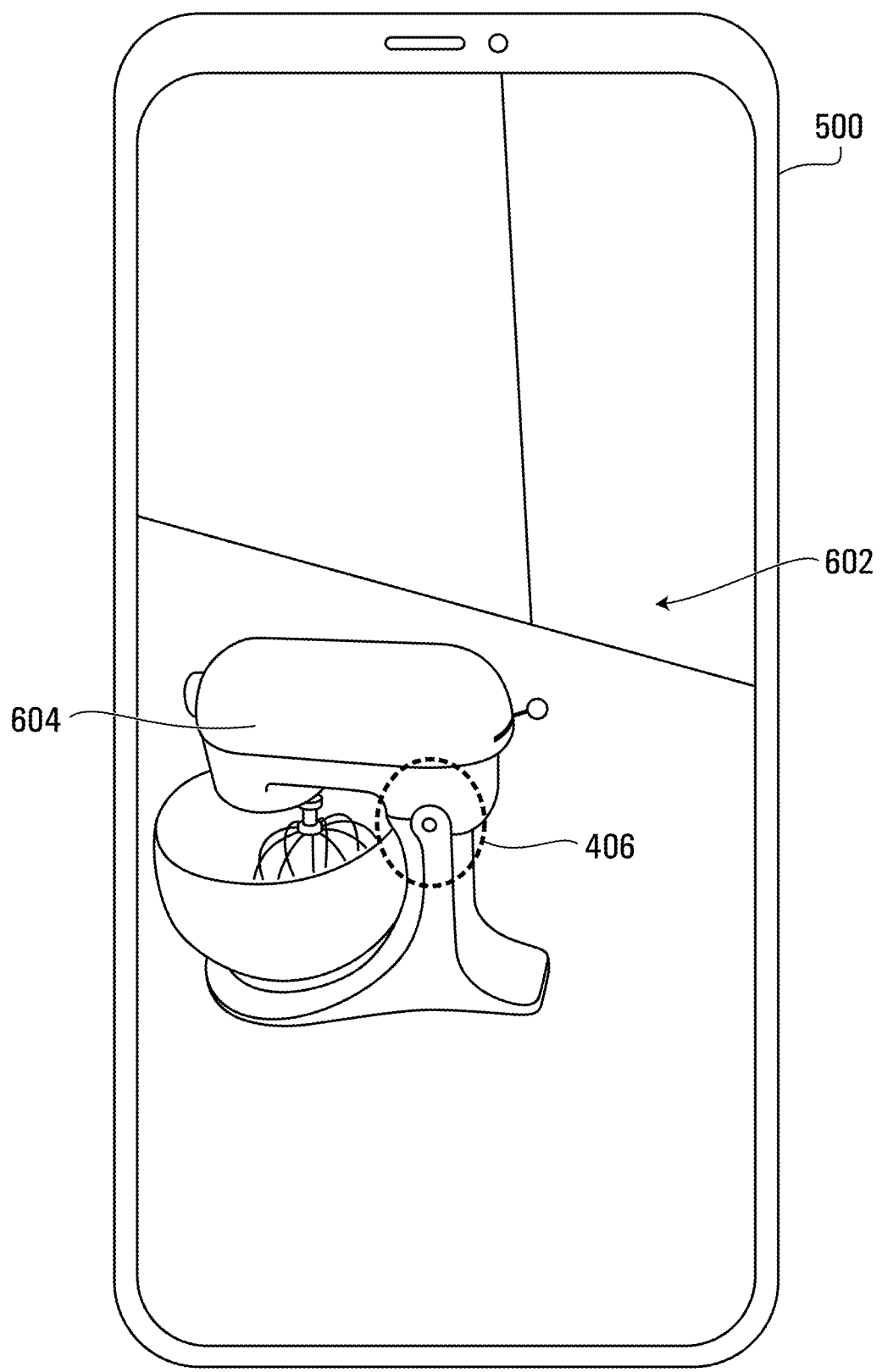

FIG. 6 illustrates the user device 500 displaying a further image 602 of the mixer. The image 602 includes a render 604 of the 3D model 400 based on the feature point 406 (the feature point 406 is indicated using a dashed circle in FIG. 6), such that the feature point 406 is the focus of the render 604. The feature point 406 may be mapped to a coordinate and/or a vector defined within the virtual coordinate system 402, which could be used to determine a viewpoint for the generation of the render 604.

In addition to the renders 504, 604 of the 3D model 400, the images 502, 602 also include background content depicting a kitchen, which provides a suitable virtual setting for the mixer. The background content may include an image, a 3D surface, and/or an environment map that is mapped to the virtual coordinate system 402. Different portions of the background content are depicted in the images 502, 602, corresponding to the different viewpoints for the renders 504, 604.

In some cases, the images 502, 602 may be implemented as product media for online merchandising of the mixer. For example, the images 502, 602 may be implemented in an online store's product page for the mixer. The images 502, 602 may also or instead be implemented in a video depicting the mixer. For example, the images 502, 602 may form different frames of the video. The video may also include additional frames that are based on further renders of the 3D model 400, which may provide a smooth transition between the images 502, 602. For example, the video may depict a smooth change in perspective from the view shown in the image 502 to the view shown in the image 602. The further renders of the 3D model 400 may be generated as the view of the 3D model 400 shifts from focusing on the feature point 404 to focusing on the feature point 406. The video may also include renders of the 3D model 400 that depict zooming in on, and out from, the feature points 404, 406. Generating a video of the mixer using the 3D model 400 may be considered digital stop motion animation of the mixer.

In some cases, the images 502, 602 may be generated in advance to avoid rendering the 3D model 400 for a user in real time. Notably, because the feature points 404, 406 may correspond to popular views of the 3D model 400, user desires to view the 3D model 400 from various directions may be satisfied by the pre-rendered featured points 404, 406 and thus the need to transmit and/or render the 3D model 400 for a given user (e.g., in an interactive fashion) may be avoided. Rendering a 3D model can be computationally expensive, and accordingly as pre-generating digital media based on feature points may avoid or lessen the need to do such rendering (e.g., avoiding rendering for a given user on a per-user basis), computing resources (e.g., processing power) may be saved.

Example Systems and Methods

Figure 7:
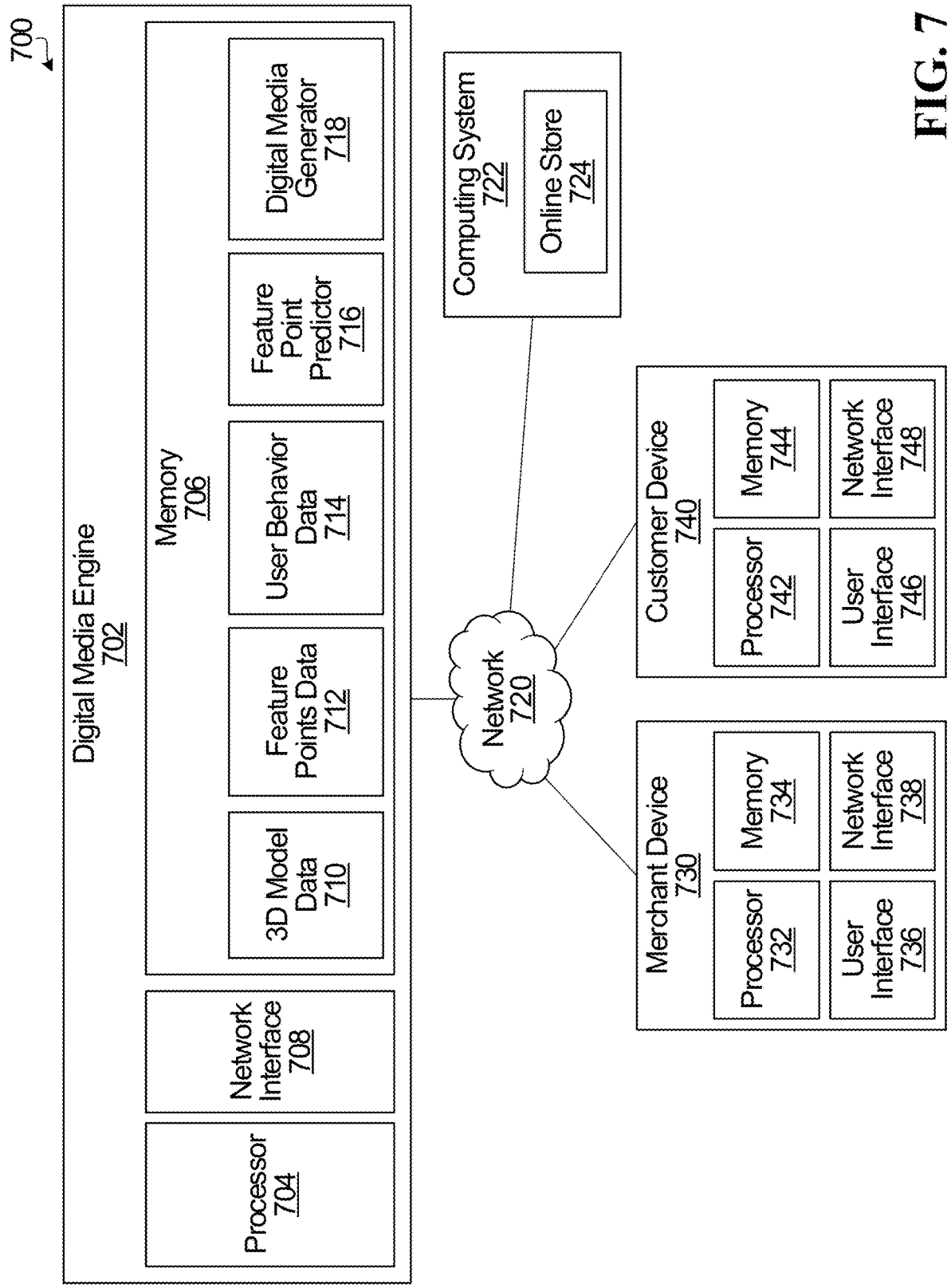
FIG. 7 is a block diagram illustrating a system for generating digital media based on feature points of objects, according to an embodiment.

FIG. 7 is a block diagram illustrating a system 700 for generating digital media based on feature points of objects, according to an embodiment. The system 700 includes a digital media engine 702, a network 720, a computing system 722, a merchant device 730, and a customer device 740.

The computing system 722 supports, hosts, or otherwise implements an online store 724, which might also or instead be an online marketplace. The structure of the computing system 722 is implementation specific. The computing system 722 may include a processor, memory, server, client, network interface, network infrastructure, mobile computing platform, cloud computing platform and/or stationary computing platform, for example. Optionally, the computing system 722 is (or is part of) an e-commerce platform. For example, the computing system 722 may be similar to the e-commerce platform 100, and the online store 724 may be similar to the online store 138.

In some implementations, the merchant device 730 is associated with the online store 724. For example, the online store 724 may be owned and/or operated by a merchant associated with the merchant device 730. The merchant device 730 may exchange hypertext transfer protocol (HTTP) messages with the computing system 722 to manage the online store 724. The merchant device 730 may be a mobile phone, tablet, laptop, headset, smart watch, television, POS device or computer, for example.

Similarly, the customer device 740 may be, for example, a mobile phone, tablet, laptop, headset, smart watch, television, POS device or computer owned and/or used by a customer. The customer may be a previous, current and/or potential customer of the online store 724. For example, the customer device 740 may exchange HTTP messages with the computing system 722 to navigate the online store 724. Optionally, the customer device 740 may be signed-on to an account with the online store 724 so that the identity of the customer is known to the computing system 722.

As illustrated, the merchant device 730 includes a processor 732, memory 734, user interface 736 and network interface 738. The customer device 740 also includes a processor 742, memory 744, user interface 746 and network interface 748. The customer device 740 will be described by way of example below. However, it should be noted that the merchant device 730 may be implemented in the same or a similar way.

The user interface 746 may include, for example, a display screen (which may be a touch screen and/or a transparent display screen), a gesture recognition system, a speaker, headphones, a microphone, haptics, a keyboard, and/or a mouse. The user interface 746 may receive user input from a user (e.g., using the keyboard and/or the mouse). The user interface 746 may also or instead present digital content to a user, including visual, haptic and/or audio content. In some implementations, the customer device 740 includes implanted devices or wearable devices, such as a device embedded in clothing material, or a device that is worn by a user, such as glasses.

The network interface 748 is provided for communicating over the network 720. The structure of the network interface 748 will depend on how the customer device 740 interfaces with the network 720. For example, if the customer device 740 is a mobile phone or tablet, then the network interface 748 may include a transmitter/receiver with an antenna to send and receive wireless transmissions to/from the network 720. If the customer device 740 is a personal computer connected to the network with a network cable, then the network interface 748 may include, for example, a network interface card (NIC), a computer port (e.g., a physical outlet to which a plug or cable connects), and/or a network socket.

The processor 742 directly performs or instructs all of the operations performed by the customer device 740. Examples of these operations include processing user inputs received from the user interface 746, preparing information for transmission over the network 720, processing data received over the network 720, and instructing a display screen to display information. The processor 742 may be implemented by one or more processors that execute instructions stored in the memory 744. Alternatively, some or all of the processor 742 may be implemented using dedicated circuitry, such as an application specific integrated circuit (ASIC), a graphics processing unit (GPU) or a programmed field programmable gate array (FPGA).

The network 720 may be a computer network implementing wired and/or wireless connections between different devices, including any two or more of the digital media engine 702, the computing system 722, the merchant device 730 and the customer device 740, for example. The network 720 may implement any communication protocol known in the art. Non-limiting examples of communication protocols include a local area network (LAN), a wireless LAN, an internet protocol (IP) network, and a cellular network.

In FIG. 7, the number of merchant and customer devices are shown by way of example. Any number of merchant devices and customer devices may be implemented in the system 700. In addition, any number of online stores may be implemented in the system 700.

The digital media engine 702 is a computing system or device configured to generate digital media based on object feature points. This digital media may include, but is not limited to, product media that is implemented in the online store 724 and/or in other forms of digital merchandising. In some implementations, product media may be rapidly generated by the digital media engine 702 in response to a request from a merchant and/or an online store. As an example, the merchant device 730 may transmit a request to the digital media engine 702 for a product image and/or a product video depicting a product. The merchant device 730 may also provide a 3D model of the product and/or a record of product feature points. Alternatively or additionally, the digital media engine 702 may obtain a 3D model and/or a record of product feature points from memory in response to the request. The product image and/or product video may be generated based on the 3D model and the record of feature points and, once generated, may be transmitted to the merchant device 730 for approval. If the product image and/or product video are approved by the merchant, then they may be transmitted to the computing system 722 and added to a database of product media for the online store 724.

As illustrated, the digital media engine 702 includes a processor 704, memory 706, and a network interface 708. The processor 704 may be implemented by one or more processors that execute instructions stored in the memory 706 or in another non-transitory computer readable medium. These instructions could implement any method described herein. Alternatively, some or all of the processor 704 may be implemented using dedicated circuitry, such as an ASIC, a GPU, or a programmed FPGA. The network interface 708 is provided for communication over the network 720. The structure of the network interface 708 is implementation specific. For example, the network interface 708 may include a NIC, a computer port, and/or a network socket.

The digital media engine 702 and the computing system 722 are shown separately in FIG. 7. However, in some implementations, the digital media engine 702 and the computing system 722 may be at least partially combined. For example, the computing system 722 may implement both the digital media engine 702 and the online store 724. While the digital media engine 702 is shown as a single component, a digital media engine could instead be provided by multiple different components that are in communication via a network.

As illustrated, the memory 706 stores 3D model data 710, feature points data 712, user behaviour data 714, a feature point predictor 716, and a digital media generator 718.

The 3D model data 710 may include one or more 3D models corresponding to one or more objects. At least some of these objects could be products sold through online stores and/or online marketplaces (e.g., through the online store 724). However, the 3D model data 710 may also or instead store 3D models that are not related to commerce. A 3D model stored in the 3D model data 710 may include, for example, a polygonal mesh, a texture image, a point cloud, a solid model, and/or virtual lighting, for example. The 3D model data 710 may store 3D models in any of a variety of different file formats, including GLTF, GLB, USDZ, STL, OBJ, FBX, COLLADA, 3DS, IGES, STEP, and VRML/X3D. The 3D model files may be read and/or rendered on a display device via 3D software such as Autodesk™ or SOLIDWORKS™, for example. Further, a 3D model stored in the 3D model data 710 may include an identifier (e.g., a unique alphanumeric string assigned to the 3D model) and/or an identifier of the object that the 3D model corresponds to (e.g., a brand name, a manufacturer part number (MPN), a global trade item number (GTIN), and/or a stock keeping unit (SKU)).

It should be noted that a 3D model of an object includes a representation of the object but is not limited to the object. The 3D model may represent other objects and/or entities, including light sources and/or background objects, for example. As such, the phrase "3D model of X" does not limit the 3D model to only representing X.

The 3D models in the 3D model data 710 could be obtained in any of a number of different ways. At least some of the 3D models may be obtained from the computing system 722 and/or from the merchant device 730. For example, a merchant could generate 3D models of any, one, some, or all of the products sold in the online store 724. A 3D model may be generated manually using graphical design software implemented on a user device and/or may be generated based on measurements of a real-world object. Possible methods for generating 3D models based on a real-world object include photogrammetry and 3D scanning. The 3D models generated by a merchant may be provided directly to the digital media engine 702 by the merchant device 730. Alternatively or additionally, the 3D models may be stored on the computing system 722 for implementation in the online store 724, and the digital media engine 702 may obtain the 3D models from the computing system 722. The digital media engine 702 may also or instead obtain 3D models from other computing systems, such as e-commerce platforms and/or social media platforms, for example.

In some implementations, 3D models are temporarily stored in the 3D model data 710 for the generation of digital media at the digital media engine 702. After digital media is generated based on the 3D models, the 3D models might be removed from the memory 706.

The feature points data 712 identifies feature points of one or more objects, which may be used to guide the generation of digital media depicting those objects. The feature points may correspond to, inter alia, parts, regions, and/or viewpoints of an object that are known to be significant. In some implementations, the 3D model data 710 and the feature point data 712 may pertain to one or more of the same objects. For example, the 3D model data 710 may include a 3D model for a particular object, and the feature points data 712 may identify one or more feature points of that object. The one or more feature points may be mapped to the 3D model such that views of the 3D model representing the one or more feature points are identified. Such a mapping may include a position and/or a directionality within a virtual coordinate system of the 3D model that corresponds to a feature point. By way of example, the 3D model data 710 may include the 3D model 400 of FIG. 4, and the feature points data 712 may identify the feature points 404, 406. The feature point data 712 may also include a mapping between the feature points 404, 406 and the 3D model 400. For example, the feature points data 712 may include a coordinate and/or a vector for each of the feature points 404, 406 within the virtual coordinate system 402.

In some implementations, the 3D model data 710 and the feature points data 712 may be at least partially combined. For example, feature points data corresponding to a particular 3D model may be stored as a companion file and/or as metadata for the 3D model.

It should be noted that the feature points of an object are not limited to different parts, regions, and/or viewpoints of the object. In some implementations, the feature points of an object may correspond to different object configurations. For example, an object may include moving parts that provide certain functionality (e.g., a folding chair), and a 3D model of the object may be configured to simulate the movement of these parts. The 3D model may include multiple elements representing the movable parts that are virtually movable relative to each other. Feature points of the object may correspond to different configurations of the moving parts and may be mapped to different arrangements of the elements in the 3D model. In this way, the 3D model may be manipulated and rendered based on the feature points of the object to illustrate the different configurations of the moving parts.

In some implementations, the feature points data 712 may include digital content pertaining to one or more identified feature points of an object. The digital content may include, for example, text and/or audio content that describes a feature point. In this way, the digital content may annotate the feature points of the object. When annotated feature points in the feature points data 712 are mapped to a 3D model, the 3D model may be considered an annotated 3D model. Digital content from the feature points data 712 may be used to supplement renders of an annotated 3D model. For example, text that pertains to a particular feature point may be overlaid onto renders of the 3D model that depict this feature point. Alternatively or additionally, audio content that pertains to a particular feature point may be played over renders of the 3D model that depict the feature point. The audio content may be generated through text-to-voice technology, for example.

According to one example, the feature points data 712 pertaining to a particular feature point of an object may include any, some, or all of the following information:

- An identifier of the feature point, such as a unique alphanumeric string assigned to the feature point, for example.
- An identifier of the object that the feature point corresponds to. In the case that the object is a product sold online or elsewhere, this identifier may be a brand name, an MPN, a GTIN, and/or an SKU, for example.
- An identifier of a 3D model of the object that the feature point is mapped to, which may be a 3D model stored in the 3D model data 710. The identifier may be a unique alphanumeric string assigned to the 3D model, for example.
- A mapping between the feature point and the 3D model. For example, the mapping may include a coordinate and/or a vector defined within a virtual coordinate system of the 3D model.
- Digital content corresponding to the feature point, including text and/or audio content that describes the functionality or significance of the feature point.

The feature points data 712 may be obtained in any of a number of different ways. In some implementations, a merchant could provide at least a portion of the feature points data 712. For example, using the merchant device 730, a merchant may identify coordinates on a mesh of a 3D model that correspond to interesting features of a product and label each of these coordinates as a feature point of the product. This may be considered assigning markers to the 3D model of the product. A merchant may also generate or otherwise provide digital content for a feature point. In some cases, the feature point data provided by a merchant may be generated and transmitted to the digital media engine 702 by the merchant device 730.

In some implementations, the digital media engine 702 and/or another computing system could automatically generate at least a portion of the feature points data 712. By way of example, the digital media engine 702 may apply the user behaviour data 714 and the feature point predictor 716 to determine feature points of objects. The user behaviour data 714 includes information pertaining to the online activity of one or more users, which may be analysed by the feature point predictor 716 to determine potential feature points of an object. For example, the feature point predictor 716 may include and/or implement one or more algorithms (possibly in the form of software instructions executable by the processor 704) to analyse the user behaviour data 714 and output suggested feature points of an object.

At least some of the user behaviour data 714 may be obtained from databases associated with online stores, such as the online store 724, for example. However, the user behaviour data 714 may also or instead be obtained from databases associated with an online marketplace, an e-commerce platform, and/or a social media platform. Alternatively or additionally, the user behaviour data 714 may be provided through direct merchant input using, for example, the merchant device 730. The user behaviour data 714 may be stored using any of a variety of different data structures, including a list, an array (of any dimension) and/or a data tree, for example.

In some implementations, the user behaviour data 714 includes records of user interactions with digital content related to one or more objects (e.g., user interactions with images, videos, and/or 3D models depicting the one or more objects). The user interactions may indicate feature points of the objects corresponding to high user interest. At least some of the user interactions may relate to product media implemented in the online store 724. For example, the computing system 722 may track customer interactions with the product media and send records of those interactions to the digital media engine 702. For a given object, non-limiting examples of user interactions that may be recorded in the user behaviour data 714 are provided below.

- User interactions related to selecting a view of a 3D model of the object. These user interactions may indicate particular parts, regions, viewpoints, and/or configurations of the object that customers frequently view. For example, the user interactions may include rotating, magnifying (e.g., zooming in on), and/or otherwise manipulating the 3D model to obtain renders that depict a particular part, region, and/or viewpoint of the object. The user interactions may also or instead include manipulating different elements of the 3D model to depict a particular configuration of the object. The number of times that users select a particular view of the 3D model and/or the amount of time that users typically spend with the particular view may be recorded. A heat map may be generated for the 3D model that indicates user viewing data (e.g., the number of user views and/or the amount of user viewing time) for the different portions of the 3D model. If the 3D model includes a polygonal mesh, then the heat map may include user viewing data for each polygon in the mesh.
- User interactions with images depicting the object, including frames of a video that depict the object. Images of the object that are viewed more than others, that are viewed for a longer period of time, and/or that are frequently magnified may indicate parts, viewpoints, regions, and/or configurations of the object that are of interest to users. For example, multiple different images of the object may be implemented in the online store 724, and the number of times that each image is viewed by customers may be recorded. Further, the amount of time that each image is viewed may also be recorded.
- User interactions with digital media that are linked to customers purchasing the object online. For example, the last render of a 3D model of the object and/or the last image of the object presented to the customer before they add the object to their shopping cart in the online store 724 may be linked to a sale of the object. The number of times that users view a particular part, region, viewpoint, and/or configuration of the object before a sale may be recorded.
- User interactions in online forums that relate to the object. These interactions may include references to the object in customer reviews and/or social media posts, for example. The references may include posts related to the object, such as a question that a customer asks in a chat system of the online store 724. For example, the customer may post "how does this chair unfold?" in the chat system.

The feature point predictor 716 may include a set of defined conditions for determining a feature point based on user interactions recorded in the user behaviour data 714. In some cases, the defined conditions may be provided by a merchant to determine feature points for their products. If a threshold number of the conditions are met (e.g., one or more conditions, two or more conditions, etc.) by a part, region, viewpoint, and/or configuration of an object, then the feature point predictor 716 may output an indication that the part, region, viewpoint, and/or configuration could be implemented as a feature point. In one example, the user behaviour data 714 may indicate that the number of user views of a 3D model corresponding to a particular viewpoint of an object meets a defined condition (e.g., the number of user views from this viewpoint exceeds a threshold). The feature point predictor 716 might then output a potential feature point of the object that corresponds to this viewpoint. In another example, the user behaviour data 714 may indicate that user magnification of a 3D model to zoom in on a particular region of an object meets a defined condition. The feature point predictor 716 might then determine a feature point of the object that corresponds to this region. In yet another example, the user behaviour data 714 may indicate that the number of user views of an image depicting a particular region of an object meets a defined condition. The feature point predictor 716 might determine a feature point of the object that corresponds to this region. In a further example, the feature point predictor 716 might determine that the number of user references to a part of an object in online forums meets a defined condition. The feature point predictor 716 might then determine a feature point of the object that corresponds to this part.

Alternatively or additionally, the feature point predictor 716 may include and/or implement machine learning algorithms and other predictive algorithms to help determine potential feature points. For example, a training data set may be formed using user behaviour data pertaining to multiple objects and user-selected (e.g., merchant-selected) feature points of those objects. A machine learning (ML) model may then be trained using the training data set. Once trained, the ML model may analyse the user behaviour data 714 pertaining to an object and output suggestions for feature points of the object. Non-limiting examples of ML model structures include artificial neural networks, decision trees, support vector machines, Bayesian networks, and genetic algorithms. Non-limiting examples of training methods for an ML model include supervised learning, unsupervised learning, reinforcement learning, self-learning, feature learning, and sparse dictionary learning.

In some implementations, feature points of an object may be obtained using a combination of user selection and system selection. For example, the feature point predictor 716 may identify a viewpoint of an object that meets a defined condition, and the digital media engine 702 may suggest this viewpoint as a feature point to a merchant via the merchant device 730. The merchant may then approve of the feature point and/or select a mapping between this feature point and a 3D model. Alternatively or additionally, a merchant may use the merchant device 730 to select a feature point of an object, and the feature point predictor 716 may automatically map the feature point to a 3D model. For example, the feature point predictor 716 may determine a coordinate and/or a vector within a virtual coordinate system of the 3D model that corresponds to the feature point of the object.

In some implementations, a user could provide digital content for one or more system-selected feature points. For example, a merchant may be provided with a list of feature points that are determined based on customer interactions. The merchant may then provide digital content for one or more of the feature points. Digital content for the feature points of a product may also or instead be obtained from customers. For example, customer reviews of a product and/or social media posts pertaining to a product may be collected and used to form digital content. Customer-provided digital content may be parsed by the digital media engine 702 to determine which feature points of a product the digital content corresponds to. A merchant may also or instead help determine which customer-provided digital content corresponds to which feature points.

In some implementations, at least a portion of the user behaviour data 714 may be specific to one or more users. This may help determine "personalized feature points" that are determined in a user-specific manner. For example, the information in the user behaviour data 714 may be organized in terms of different customers of the online store 724 (e.g., previous customers of the online store 724 and/or registered customer accounts on the online store 724). The user behaviour data 714 may also or instead relate to customers and/or customer accounts of other online stores, online marketplaces and/or e-commerce platforms. The portion of the user behaviour data 714 relating to a particular user may be input into feature point predictor 716 to obtain personalized feature points for that user.

In some implementations, at least a portion of the user behaviour data 714 may relate to one or more different geographic regions. This may help determine feature points in a region-specific manner. For example, customer behaviour may vary between cities and/or countries, and feature points could be suggested to reflect those differences. Customer behaviour data may be assigned to a geographic region in any of a variety of different manners. For example, customer interactions with digital media may be assigned a geographic region based on the internet protocol (IP) address of a customer device.

The digital media generator 718 will now be described. The digital media generator 718 includes and/or implements one or more algorithms (possibly in the form of software instructions executable by the processor 704) to generate digital media based on the 3D model data 710 and/or the feature points data 712. In some implementations, the digital media generator 718 is configured to generate digital media quickly and efficiently by rendering pre-existing 3D models obtained from the 3D model data 710. The digital media generator 718 may render a 3D model based on a feature point obtained from the feature points data 712. For example, a view of the 3D model for the render may be determined based on a mapping between the feature point and the 3D model. The digital media generator 718 may perform perspective projection to transform the view of the 3D model into a 2D image (e.g., using rasterization and/or ray tracing) and optionally perform shading to depict virtual lighting in the render. The images 502, 602 of FIGS. 5 and 6 are examples of digital content that might be generated using the digital media generator 718.

Figure 8:
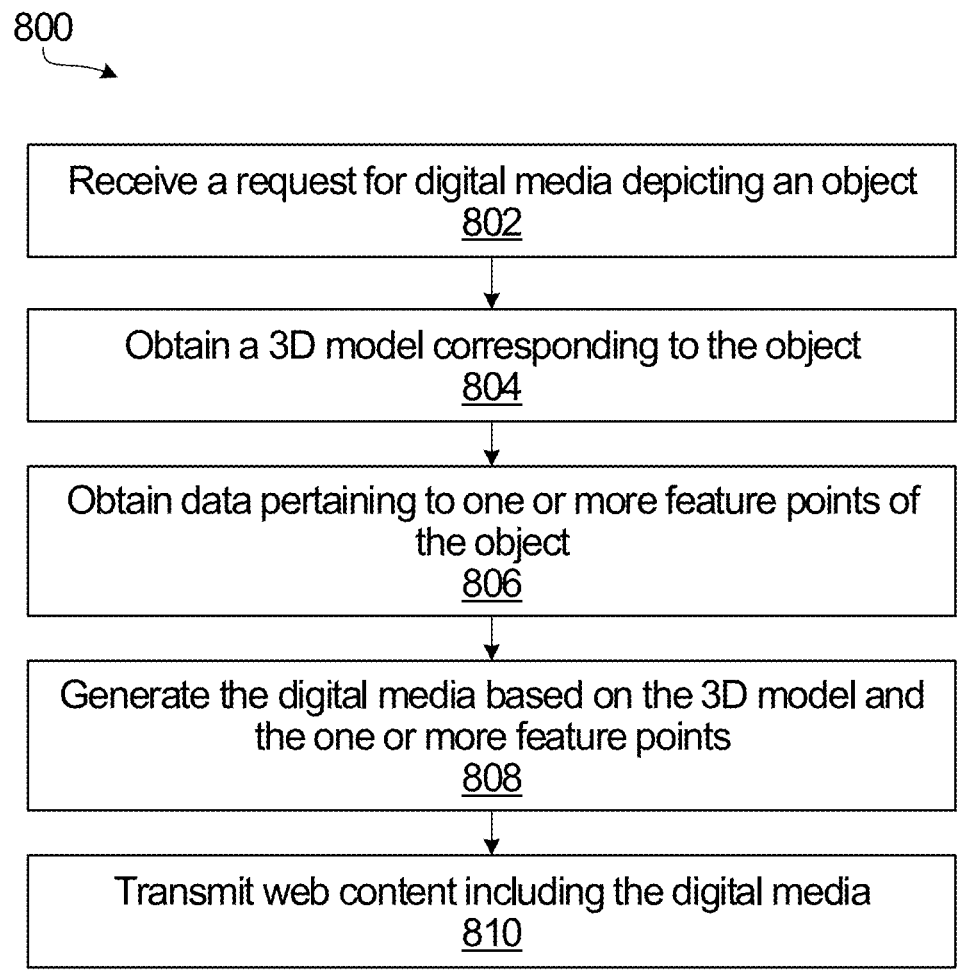
FIG. 8 is a flow diagram illustrating a method for generating digital media based on feature points of an object, according to an embodiment.

An example method will now be described. FIG. 8 is a flow diagram illustrating a method 800 for generating digital media based on feature points of an object, according to an embodiment. The method 800 will be described as being performed, at least in part, by the digital media engine 702 of FIG. 7. For example, the memory 706 may store instructions which, when executed by the processor 704, cause the processor 704 to perform the method 800. However, other implementations of the method 800 are also contemplated. In general, the method 800 is not limited to a digital media engine and may instead be performed in whole or in part by a merchant device, a customer device, and/or an e-commerce platform, for example.

Step 802 includes the processor 704 receiving a request for digital media depicting an object. In some cases, the request may specify a type of digital media (e.g., a request for an image, multiple images, or a video). The request may be received as an HTTP message from the merchant device 730, the customer device 740, or the computing system 722, for example. Optionally, the request may be associated with a software instance on a computing system. An example of such a software instance is the online store 724 on the computing system 722. The request received in step 802 may be for product media depicting a product sold in the online store 724. For example, a merchant may use the merchant device 730 to send the request for the product media to the digital media engine 702, with the intention of implementing the product media in a product page and/or an advertisement on the online store 724. Alternatively or additionally, the computing system 722 may automatically transmit the request for the product media to the digital media engine 702 in response to a trigger condition. For example, a customer may navigate the online store 724 using the customer device 740 and request a video of a product sold in the online store 724. The computing system 722 might then determine that such a video is not currently available and transmit a request for the video to the digital media engine 702. In this way, the request for the video from the customer device 740 is an example of a trigger condition that causes the computing system 722 to transmit a request for the video to the digital media engine 702.

Step 804 includes the processor 704 obtaining a 3D model corresponding to the object. This 3D model may be obtained from the 3D model data 710, for example. An identifier assigned to the object may be used to locate a corresponding 3D model in the 3D model data 710. Alternatively or additionally, the digital media engine 702 may receive the 3D model from the merchant device 730 or the computing system 722.

Step 806 includes the processor 704 obtaining data pertaining to one or more feature points of the object. The one or more feature points may correspond to respective views of the 3D model. In some cases, these views of the 3D model may be defined by a mapping between the feature points of the object and the 3D model. The mapping for a given feature point may include a position and/or a directionality within a virtual coordinate system of the 3D model, which may correspond to a particular viewpoint, perspective, and/or level of magnification relative to the object. Alternatively or additionally, the one or more feature points may map to respective configurations of different elements in the 3D model (e.g., to simulate different configurations of parts in the object).

In some implementations, at least a portion of the data pertaining to the one or more feature points is obtained from memory. For example, the data may be obtained from the feature points data 712 based on an identifier of the object and/or an identifier of the 3D model. Alternatively or additionally, step 806 may include receiving, from a user device, web content (e.g., an HTTP message) indicating user selection of at least one of the one or more feature points. For example, the merchant device 730 may transmit this web content. Consider a case in which the request for the digital content is transmitted by the merchant device 730 in step 802. The 3D model corresponding to the object may then be obtained in step 804 and transmitted to the merchant device 730. The merchant may view the 3D model on the merchant device 730 and use the 3D model to select the one or more feature points. Web content indicating the merchant's selection of the one or more feature points might then be transmitted to the digital media engine 702 in step 806.

In some implementations, step 806 includes generating the data pertaining to one or more feature points based on stored data pertaining to user interactions. These may be user interactions with the 3D model obtained in step 804 and/or with other digital content related to the object (e.g., images, videos, online reviews, and/or online question boards pertaining to the object). An example of stored data pertaining to user interactions is the user behaviour data 714. Step 806 may include using the feature point predictor 716 to analyse at least a portion of the user behaviour data 714 and determine the one or more feature points. The feature point predictor 716 may also determine a mapping between the one or more feature points and the 3D model obtained in step 804. In some implementations, the stored data pertaining to the user interactions may indicate user views of a particular feature point of the object. For example, the stored data may include records of one or more users manipulating the 3D model of the object to view this particular feature point of the object. Generating the data pertaining to the one or more feature points might then include adding the particular feature point to the one or more feature points based on the user views. Other examples of determining feature points of an object based on user interactions are provided elsewhere herein.

In some implementations, at least a portion of step 806 may be performed before step 802. For example, the merchant device 730 may be used to select one or more feature points, and data pertaining to those one or more feature points may be transmitted to the digital media engine 702 and stored in the feature points data 712. At a later time, the merchant device 730 and/or the computing system 722 may transmit a request for digital content in step 802, resulting in the data pertaining to the one or more feature points being obtained from the feature points data 712.

Step 808 includes the processor 704 generating digital media based on the 3D model obtained in step 804 and the one or more feature points identified in step 806. This digital media may correspond to the digital media requested in step 802. The digital media may be generated using the digital media generator 718, for example. In some implementations, the digital media includes renders of the 3D model depicting the one or more feature points of the object. For example, each of the renders may be generated from a respective view of the 3D model that corresponds to a feature point. The view of the 3D model that corresponds to a feature point may be determined based on a mapping between the feature point and the 3D model.

It should be noted that the digital media generated in step 808 is not limited to renders of the 3D model. The digital media might also include background content that is added to the renders, for example.

In some implementations, step 808 includes generating a video of the object using, for example, digital stop motion animation of the object. The video might be a video flyby, for example. The video may include the renders of the 3D model that depict the feature points of the object and may also include transitions between those renders. The transitions may include, or be based on, further renders of the 3D model. For example, the video may include one or more renders of the 3D model that show a first feature point of the object and include further renders of the 3D model that depict movement to a second feature point of the object. The video may also include renders of the 3D model that depict zooming in on, and out from, the feature points. The transitions in the video may depict a smooth motion between the feature points of the object, similar to how a video camera might be moved relative to the object in the real-world.

In some implementations, the data pertaining to the one or more feature points obtained in step 806 includes digital content corresponding to a particular feature point. In these implementations, step 808 may include combining the digital content with a particular render of the 3D model that depicts the particular feature point. The digital content may be received from a user device, such as the merchant device 730, for example. Alternatively or additionally, the digital content may be obtained from the feature points data 712. The digital content may include text pertaining to the particular feature point, in which case step 808 may include associating the text with a portion of the particular render corresponding to the particular feature point. For example, the text may be overlaid with the render to label the particular feature point and/or the text may be implemented as a subtitle or caption for the render. The digital content may also or instead include audio content pertaining to the particular feature point. For example, this audio content may be a voice recording provided by the merchant device 730 and/or be generated using text-to-voice software. Step 808 may include synchronizing at least a portion of the audio content with the particular render in the digital media. For example, the digital media may be a video, and the audio content may be added to the video to provide commentary for the particular feature point.

Optional step 810 includes the processor 704 and/or the computing system 722 transmitting web content including the digital media generated in step 808 to a user device for display on the user device. In some implementations, this user device is the merchant device 730. The web content may be transmitted to the merchant device 730 in response to receiving the request for the digital media in step 802. Alternatively or additionally, the web content may be transmitted to the customer device 740. For example, the object may be sold in the online store 724, and the digital media may be provided to the computing system 722 for implementation in a product page for the object. The customer device 740 may request this product page for the object while navigating the online store 724, which could be transmitted to the customer device 740 in step 810.

In some implementations, the digital media is generated in a user-specific manner in the method 800. For example, the feature points of the object may be selected in a user-specific manner. Step 806 may include generating the data pertaining to the one or more feature points based on stored data pertaining to user interactions that correspond to a particular user. These user interactions may be analysed by the feature point predictor 716 to determine the feature points of the object that the particular user might be most interested in. In this way, the one or more feature points of the object obtained in step 806 may be personalized based on the particular user's preferences and/or their previous online behavior. Personalized digital media that is specific to the particular user may be generated in step 808 based on the one or more feature points. Further, web content including the personalized digital media might be transmitted to a user device associated with the user in step 810. In some cases, the personalized digital media may be generated and transmitted as web content in real-time responsive to a user requesting an image and/or a video of the object (e.g., responsive to the customer device 740 requesting a product page of the online store 724).

User-specific feature points of an object may be determined using stored data pertaining to a user's interactions with digital media depicting related objects. By way of example, if a user's previous interactions with digital media depicting mountain bikes indicates that the user places an importance on the suspension of mountain bikes, then feature points related to suspension systems may be determined in step 806 and used to generate other digital media for the user in step 808. When the user searches for mountain bikes online, for example, personalized digital media may be generated for the user in real-time using feature points related to mountain bike suspension systems. The personalized digital media may then be transmitted to a user device of the user in step 810. In this way, images and/or videos of objects may be specifically generated for this user to emphasize the features that the user is more interested in.

It should be noted that the order of steps 802, 804, 806, 808, 810 shown in FIG. 8 is provided by way of example only. Other orders are also contemplated. For example, step 806 may be performed before step 804.

Further Examples

Figure 9:
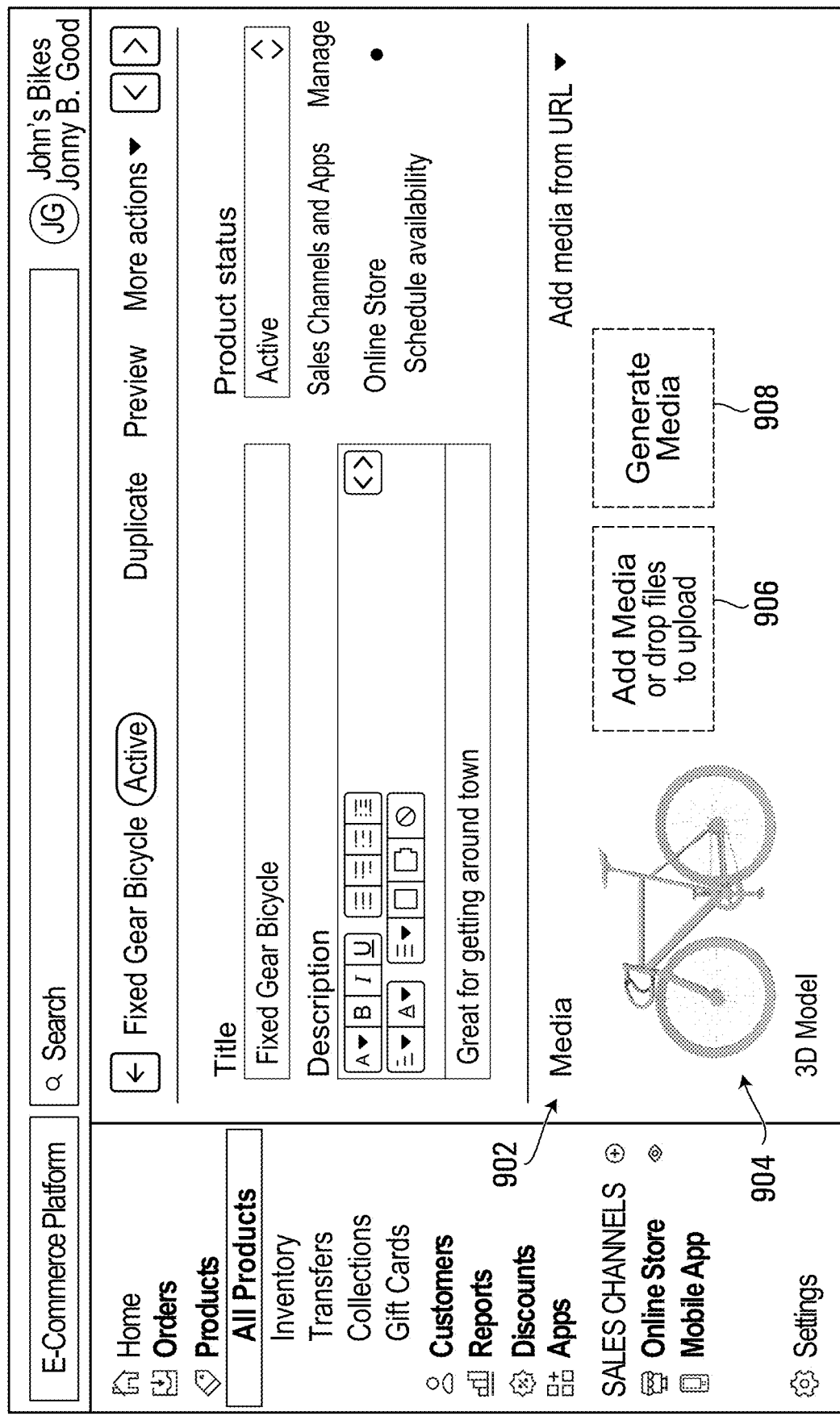
FIGS. 9 and 10 illustrate screen pages of an administrator on an e-commerce platform used for generating product media, according to an embodiment.

FIGS. 9 to 13 show an example implementation of the method 800. FIG. 9 illustrates a screen page 900 of an administrator on an e-commerce platform, according to an embodiment. For example, the screen page 900 may correspond to the administrator 114 on the e-commerce platform 100 of FIG. 1 and may be accessed through the home page shown in FIG. 2. The administrator is associated with a merchant's account on the e-commerce platform. The screen page 900 allows the merchant to manage a product (illustratively, a "Fixed Gear Bicycle") sold through their online store. The merchant may access the screen page 900 via a merchant device, such as the merchant device 730, for example.

The screen page 900 includes a media section 902 that allows the merchant to manage product media. The media section 902 includes an indication 904 that a 3D model of the product is implemented in the online store, an option 906 to upload new product media, and an option 908 to generate new product media. Selection of the option 908 may result in a request for product media being transmitted from a merchant device to the e-commerce platform. In some implementations, the method 800 is performed by the e-commerce platform, and the request for the product media is received by the e-commerce platform in step 802.

Figure 10:
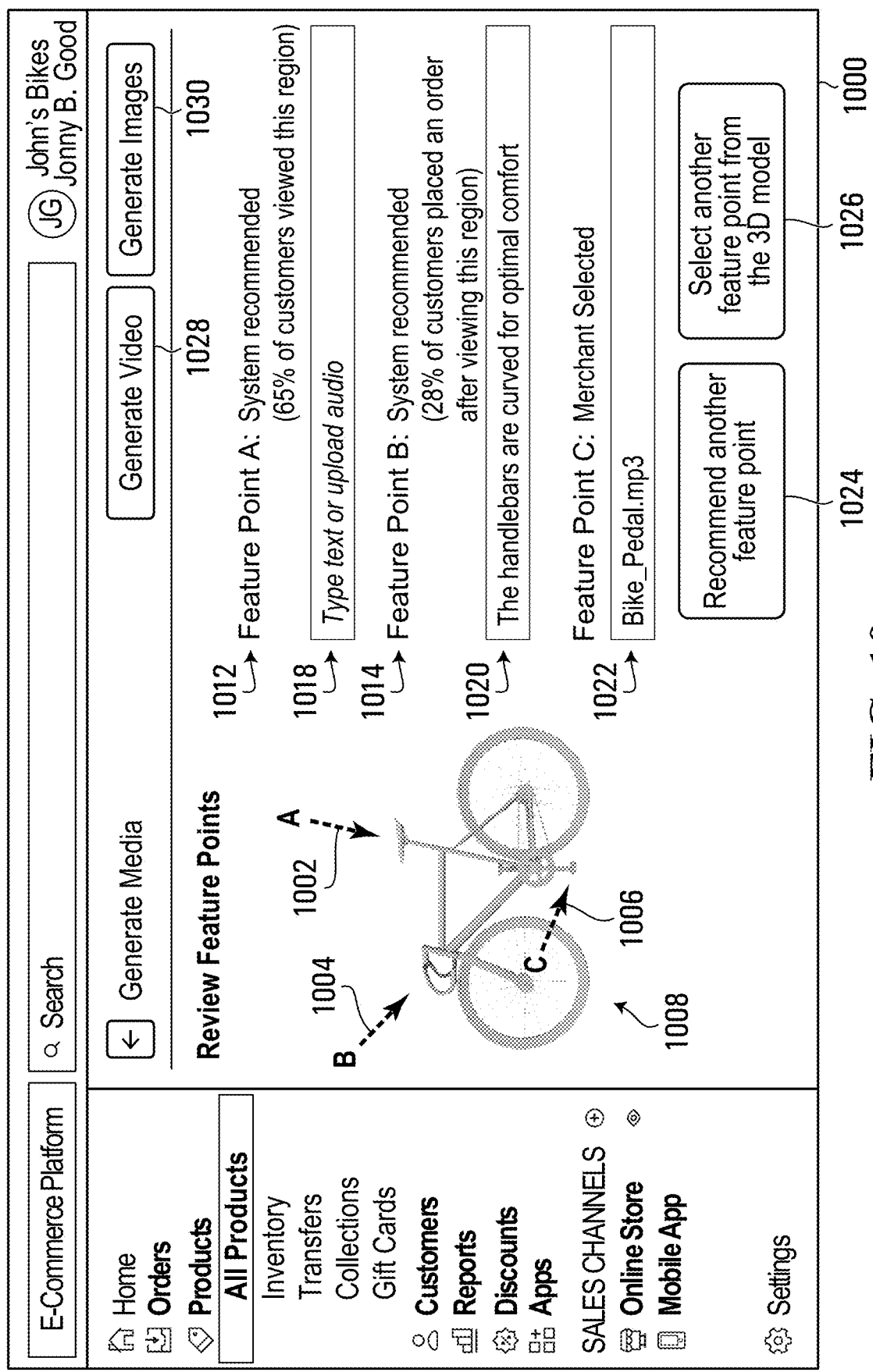

FIG. 10 illustrates another screen page 1000 of the merchant's administrator on the e-commerce platform. The screen page 1000 may be provided to the merchant upon selection of the option 908 in the screen page 900, for example. The screen page 1000 allows the merchant to approve and configure feature points of the product that are used to generate product media. The pre-existing 3D model of the product is shown at 1008 in the screen page 1000. Multiple feature points 1002, 1004, 1006 of the product are indicated on the 3D model 1008 using dashed arrows, which represent the position and the directionality of the feature points 1002, 1004, 1006 relative to the object. The feature points 1002, 1004, 1006 are referred to as "Feature Point A", "Feature Point B", and "Feature Point C", respectively, in the screen page 1000.

The feature points 1002, 1004 are system-selected feature points suggested by the e-commerce platform based on user interactions with the 3D model 1008 of the product. A description of the feature point 1002 is shown at 1012, which indicates that the feature point 1002 was selected based on a corresponding region of the 3D model 1008 being viewed by 65% of customers who interacted with the 3D model 1008. A description of the feature point 1004 is shown at 1014, which indicates that the feature point 1004 was selected based on 28% of the previous orders for the product being placed immediately after customers viewed a corresponding region of the 3D model 1008. The descriptions 1012, 1014 may indicate how the feature points 1002, 1004 each meet certain defined conditions. For example, the merchant may have defined a set of conditions for suggesting feature points of their products. One such condition defined by the merchant may be a threshold of 50% of customers viewing a region of a product, and another condition may be a minimum of 20% of orders being placed immediately after viewing a region of a product.

The feature point 1006 is merchant-selected. For example, the merchant may have used the screen page 1000 to manipulate the 3D model 1008 and identify a view of the 3D model 1008 that corresponds to an interesting aspect of the product. The merchant may have selected this view of the 3D model as a feature point of the object. A position and a directionality corresponding to the feature point may then have been saved by the e-commerce system in response to the merchant's selection.

The screen page 1000 includes user input fields 1018, 1020, 1022 that enable the merchant to provide digital content corresponding to the feature points 1002, 1004, 1006. For example, the merchant may type text and/or upload audio content using any of the user input fields 1018, 1020, 1022. In the illustrated example, no digital content is provided in the user input field 1018, text has been entered into the user input field 1020, and an audio file has been uploaded using the user input field 1022.

The screen page 1000 also includes an option 1024 to request that the e-commerce platform suggest another feature point and an option 1026 to enable the merchant to select another feature point. Selection of the option 1024 may instruct the e-commerce platform to analyse recorded user interactions with the 3D model 1008 to determine a new feature point that meets one or more defined conditions, for example. Selection of the option 1026 may allow the merchant to select a new feature point of the object using the 3D model 1008.

The screen page 1000 further includes two options 1028, 1030 for generating product media. The option 1028 is to generate a video of the object based on the 3D model 1008, the feature points 1002, 1004, 1006, and the digital content provided in the user input fields 1018, 1020, 1022. The option 1030 is to generate a series of images of the object based on the 3D model 1008, the feature points 1002, 1004, 1006, and the digital content provided in the user input fields 1018, 1020, 1022.

Figure 11:
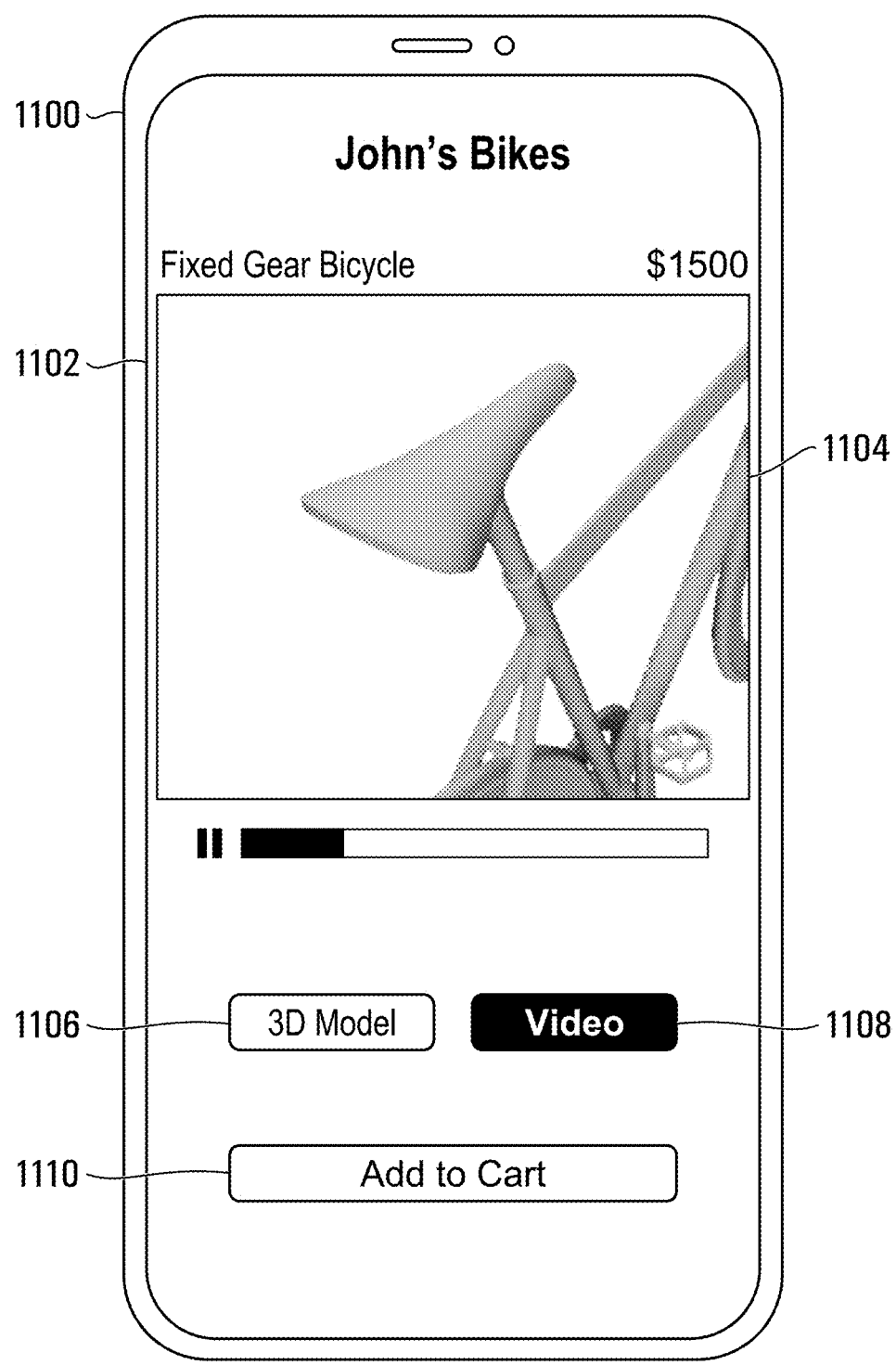
FIGS. 11 to 13 illustrate a customer device displaying screen pages of an online store that include product media generated using the screen pages of FIGS. 9 and 10.
Figure 12:
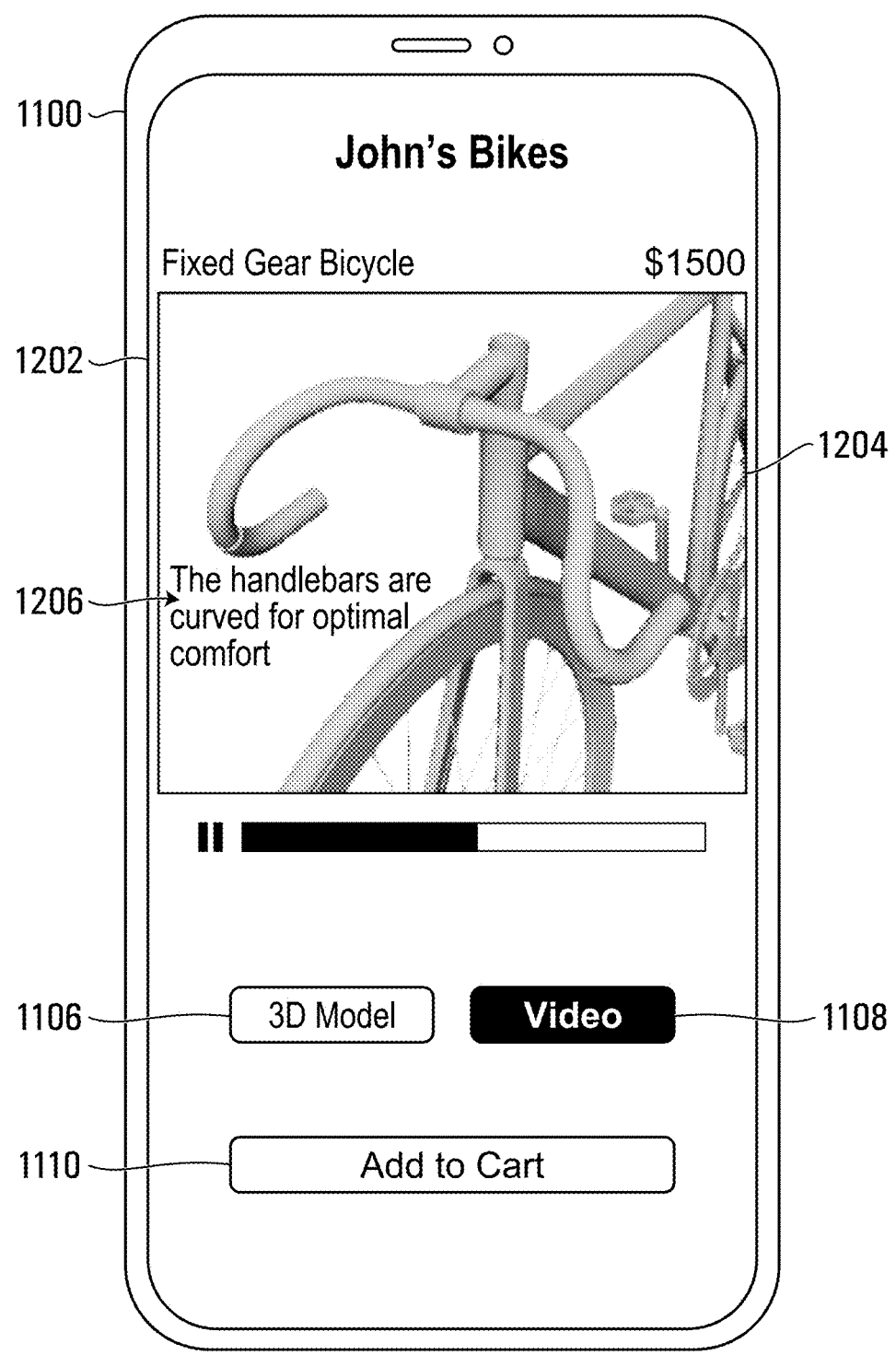
Figure 13:
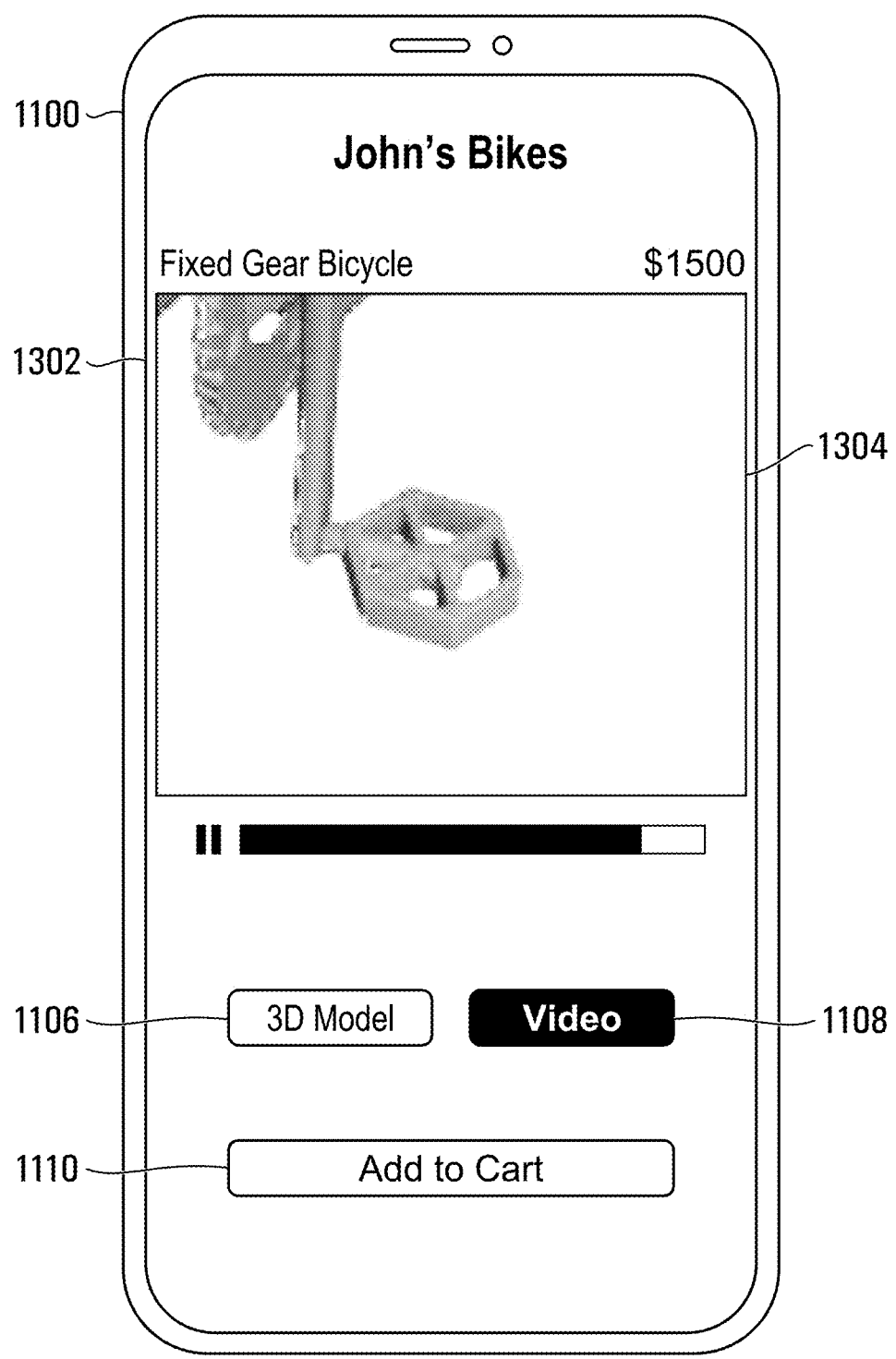

The screen page 1000 provides an example of steps 804, 806 of the method 800 being performed by the e-commerce platform. For example, the 3D model 1008 may be obtained by the e-commerce platform in step 804. In step 806, the e-commerce platform may have generated the feature points 1002, 1004 and received web content from the merchant device indicating selection of the feature point 1006. FIGS. 11 to 13 illustrate an example of digital media that may be generated in step 808 and transmitted for display on a user device in step 810. Advantageously, this digital content may be produced quickly by the e-commerce platform and with reduced effort on behalf of the merchant as compared to conventional methods involving product photography and/or videography, for example.

FIG. 11 illustrates a customer device 1100 displaying a screen page 1102 of the merchant's online store. The screen page 1102 is a product page for the "Fixed Gear Bicycle".

The screen page 1102 includes an image 1104 depicting the product, an option 1106 to view a 3D model of the product, an option 1108 to view a video of the product, and an option 1110 to purchase the product (e.g., add the product to the customer's shopping cart). In the illustrated example, the option 1108 is selected, and the image 1104 corresponds to a frame of the video. This video is an example of product media that may be generated upon selection of the option 1028 in the screen page 1000 of FIG. 10. Selection of the option 1106 in the screen page 1102 might replace the video with the 3D model 1008 of the product.

The image 1104 illustrates the feature point 1002 of the product. For example, the image 1104 may be or include a render of the 3D model 1008 that is generated based on the feature point 1002. The view of the 3D model 1008 in the render may correspond to a mapping between the feature point 1002 and the 3D model 1008. FIGS. 12 and 13 illustrate the customer device 1100 displaying further screen pages 1202, 1302 of the merchant's online store. The screen page 1202 includes an image 1204, which is another frame of the video that illustrates the feature point 1004 of the product. The screen page 1302 includes an image 1304, which is a further frame of the video that illustrates the feature point 1006 of the product. Similar to the image 1104, the images 1204, 1304 may be or include renders of the 3D model 1008 that are generated based on the feature points 1004, 1006, respectively. The video may include additional renders of the 3D model 1008 that provide smooth transitions between the images 1104, 1204, 1304. These transitions may simulate the movement of a camera between the feature points 1002, 1004, 1006 of the product, for example.

The screen page 1202 further includes text 1206 that is overlaid with the image 1204. The text 1206 corresponds to the content provided in the user input field 1020 of FIG. 10 and is used to describe the feature point 1004 in the image 1204. The audio file provided in the user input field 1022 of FIG. 10 may be synchronized with the video such that it is played on the customer device 1100 while the image 1304 is shown in the screen page 1302. In this way, the audio file may be used to describe the feature point 1006 in the image 1304.

In further embodiments, the screen pages 1102, 1202, 1302 may be generated specifically for the customer of the customer device 1100. For example, rather than being selected and approved by the merchant using the screen page 1000, the feature points 1002, 1004, 1006 could be automatically determined for the customer based on the customer's interactions with digital content different from the 3D model 1008. This digital content may relate to other bicycles, for example. These interactions may indicate that the customer places an importance on the seat, handlebars and pedals of a bicycle, and the feature points 1002, 1004, 1006 could be determined accordingly. The video shown in the screen pages 1102, 1202, 1302 could then be automatically generated when the customer requests the product page for the "Fixed Gear Bicycle" in the online store.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The invention claimed is:

1. A computer-implemented method comprising:
receiving, from a merchant device, a request for digital media depicting an object;
obtaining a three-dimensional (3D) model corresponding to the object;
obtaining data pertaining to one or more feature points of the object, the one or more feature points corresponding to respective views of the 3D model, wherein the one or more feature points include a feature point corresponding to a particular location or region of the object, the feature point associated with a coordinate on a virtual surface of the 3D model in a virtual coordinate system, and wherein a vector within the virtual coordinate system is oriented in a direction towards the coordinate to define a viewpoint relative to the 3D model for rendering a view, oriented along the vector, of the particular location or region of the object including the virtual surface of the 3D model at the coordinate, wherein the viewpoint relative to the 3D model defined by the vector is determined based on both: (i) previous online user views of the object obtained by user manipulations of the 3D model corresponding to the object including a last render of the 3D model of the object presented to a user before the user added the object to their shopping cart in an online store, and (ii) input received via the merchant device; and generating the digital media based on the 3D model and the one or more feature points, the digital media including renders of the 3D model depicting the one or more feature points, the renders including a rendered view of the viewpoint oriented along the vector to depict the particular location or region of the object, including to depict the virtual surface of the 3D model at the coordinate.

2. The method of claim 1, wherein:

the data pertaining to the one or more feature points includes digital content corresponding to the feature point; and generating the digital media comprises combining the digital content with the rendered view.

3. The method of claim 2, wherein:

the digital content comprises text pertaining to the feature point; and combining the digital content with the rendered view comprises associating the text pertaining to the feature point with a portion of the rendered view corresponding to the feature point.

4. The method of claim 2, wherein:

the digital content comprises audio content pertaining to the feature point; and combining the digital content with the rendered view comprises synchronizing at least a portion of the audio content with the rendered view in the digital media.

5. The method of claim 2, wherein:

the request for the digital media is associated with a software instance on a computing system; and obtaining the data pertaining to the one or more feature points comprises receiving the digital content from a user device associated with the software instance.

6. The method of claim 1, wherein generating the digital media comprises generating a video of the object, the video including transitions between the renders of the 3D model depicting the one or more feature points, wherein the transitions are based on further renders of the 3D model.

7. The method of claim 1, wherein obtaining the data pertaining to the one or more feature points comprises generating the data pertaining to one or more feature points based on stored data pertaining to the user manipulations of the 3D model.

8. The method of claim 7, wherein:

the stored data pertaining to the user manipulations of the 3D model indicates the previous online user views of the object; and generating the data pertaining to the one or more feature points comprises adding the feature point to the one or more feature points based on both the previous online user views of the object and the input received via the merchant device.

9. The method of claim 1, wherein:

the request for the digital media is associated with a software instance on a computing system; and obtaining the data pertaining to the one or more feature points comprises receiving, from a user device associated with the software instance, web content indicating user selection of at least one of the one or more feature points.

10. The method of claim 1, further comprising:

transmitting web content comprising the digital media to a user device for display on the user device.

11. The method of claim 10, wherein:

obtaining the data pertaining to the one or more feature points comprises generating the data pertaining to the one or more feature points based on stored data pertaining to user interactions with digital content different from the digital media, the user interactions corresponding to a particular user; and the user device is associated with the particular user.

12. The method of claim 1, wherein the user manipulations also comprise user magnifications, and the viewpoint relative to the 3D model defined by the vector is also determined based on user views of the object in which the object is magnified at the particular location or region of the object corresponding to the feature point.

13. A system comprising:

memory to store a three-dimensional (3D) model corresponding to an object and data pertaining to one or more feature points of the object, the one or more feature points corresponding to respective views of the 3D model, wherein the one or more feature points include a feature point corresponding to a particular location or region of the object, the feature point associated with a coordinate on a virtual surface of the 3D model in a virtual coordinate system, and wherein a vector within the virtual coordinate system is oriented in a direction towards the coordinate to define a viewpoint relative to the 3D model for rendering a view, oriented along the vector, of the particular location or region of the object including the virtual surface of the 3D model at the coordinate, wherein the viewpoint relative to the 3D model defined by the vector is determined based on both: (i) previous online user views of the object obtained by user manipulations of the 3D model corresponding to the object including a last render of the 3D model of the object presented to a user before the user added the object to their shopping cart in an online store, and (ii) input received via a merchant device; and at least one processor to:

receive, from the merchant device, a request for digital media depicting the object; and generate the digital media based on the 3D model and the one or more feature points, the digital media including renders of the 3D model depicting the one or more feature points, the renders including a rendered view of the viewpoint oriented along the vector to depict the particular location or region of the object, including to depict the virtual surface of the 3D model at the coordinate.

14. The system of claim 13, wherein:

the data pertaining to the one or more feature points includes digital content corresponding to the feature point; and the at least one processor is to combine the digital content with the rendered view in the digital media.

15. The system of claim 14, wherein:

the digital content comprises text pertaining to the feature point; and the at least one processor is to associate the text pertaining to the feature point with a portion of the rendered view corresponding to the feature point.

16. The system of claim 14, wherein:
the digital content comprises audio content pertaining to the feature point; and
the at least one processor is to synchronize at least a portion of the audio content with the rendered view in the digital media.

17. The system of claim 14, wherein:
the request for the digital media is associated with a software instance on a computing system; and
the at least one processor is to receive the digital content from a user device associated with the software instance.

18. The system of claim 13, wherein the digital media comprises a video of the object, the video including transitions between the renders of the 3D model depicting the one or more feature points, wherein the transitions are based on further renders of the 3D model.

19. The system of claim 13, wherein:
the memory is to store data pertaining to the user manipulations of the 3D model; and
the at least one processor is to generate the data pertaining to one or more feature points based on the stored data pertaining to the user manipulations of the 3D model.

20. The system of claim 19, wherein:
the stored data pertaining to the user manipulations of the 3D model indicates the previous online user views of the object; and
the at least one processor is to add the feature point to the one or more feature points based on both the previous online user views of the object and the input received via the merchant device.

21. The system of claim 13, wherein:
the request for the digital media is associated with a software instance on a computing system; and
the at least one processor is to receive, from a user device associated with the software instance, web content indicating user selection of at least one of the one or more feature points.

22. The system of claim 13, wherein the at least one processor is to transmit web content comprising the digital media to a user device for display on the user device.

23. The system of claim 22, wherein:
the at least one processor is to generate the data pertaining to the one or more feature points based on stored data pertaining to user interactions with digital content different from the digital media, the user interactions corresponding to a particular user; and
the user device is associated with the particular user.

24. The system of claim 13, wherein the user manipulations also comprise user magnifications, and the viewpoint relative to the 3D model defined by the vector is also determined based on user views of the object in which the object is magnified at the particular location or region of the object corresponding to the feature point.

25. A non-transitory computer readable medium storing computer executable instructions which, when executed by a computer, cause the computer to:
receive, from a merchant device, a request for digital media depicting an object;
obtain a three-dimensional (3D) model corresponding to the object;
obtain data pertaining to one or more feature points of the object, the one or more feature points corresponding to respective views of the 3D model, wherein the one or more feature points include a feature point corresponding to a particular location or region of the object, the feature point associated with a coordinate on a virtual surface of the 3D model in a virtual coordinate system, and wherein a vector within the virtual coordinate system is oriented in a direction towards the coordinate to define a viewpoint relative to the 3D model for rendering a view, oriented along the vector, of the particular location or region of the object including the virtual surface of the 3D model at the coordinate, wherein the viewpoint relative to the 3D model defined by the vector is determined based on both: (i) previous online user views of the object obtained by user manipulations of the 3D model corresponding to the object including a last render of the 3D model of the object presented to a user before the user added the object to their shopping cart in an online store, and (ii) input received via the merchant device; and
generate the digital media based on the 3D model and the one or more feature points, the digital media including renders of the 3D model depicting the one or more feature points, the renders including a rendered view of the viewpoint oriented along the vector to depict the particular location or region of the object, including to depict the virtual surface of the 3D model at the coordinate.

26. The non-transitory computer readable medium of claim 25, wherein the user manipulations also comprise user magnifications, and the viewpoint relative to the 3D model defined by the vector is also determined based on user views of the object in which the object is magnified at the particular location or region of the object corresponding to the feature point.

* * * * *